(12) United States Patent
Watts

(10) Patent No.: US 9,042,532 B2
(45) Date of Patent: *May 26, 2015

(54) SCALABLE AND FLEXIBLE INTERNET FAX ARCHITECTURE

(71) Applicant: ADVANCED MESSAGING TECHNOLOGIES, INC., Los Angeles, CA (US)

(72) Inventor: Christian M Watts, Aurora, CO (US)

(73) Assignee: Advanced Messaging Technologies, Inc., Los Angeles, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/930,145

(22) Filed: Jun. 28, 2013

(65) Prior Publication Data
US 2013/0287190 A1 Oct. 31, 2013

Related U.S. Application Data

(63) Continuation of application No. 13/533,049, filed on Jun. 26, 2012, now Pat. No. 8,503,630, which is a continuation of application No. 13/346,456, filed on Jan. 9, 2012, now Pat. No. 8,249,230.

(51) Int. Cl.
*H04M 11/00* (2006.01)
*H04N 1/00* (2006.01)
(Continued)

(52) U.S. Cl.
CPC ....... *H04N 1/00214* (2013.01); *H04N 1/00212* (2013.01); *H04N 1/0022* (2013.01);
(Continued)

(58) Field of Classification Search
CPC ............ H04N 1/00212; H04N 1/0022; H04N 1/32016; H04N 1/32085; H04N 1/00214; H04N 1/33376; H04N 1/3209; H04M 11/00

USPC ............... 379/100.17, 100.01–100.16, 88.17, 379/221.01; 370/354, 401; 709/206, 21.01; 358/1.15, 400, 401, 440, 452
See application file for complete search history.

(56) References Cited

U.S. PATENT DOCUMENTS

| 5,115,326 A | 5/1992 | Burgess et al. |
| 5,195,085 A | 3/1993 | Bertsch et al. |

(Continued)

FOREIGN PATENT DOCUMENTS

| EP | 0 609 016 | 8/1994 |
| GB | 2 024 561 | 1/1980 |

(Continued)

OTHER PUBLICATIONS

FaxSav Incorporated. (Jun. 11, 1997). How FaxMailer Works. FaxMailer. Retrieved May 3, 2012, from http://web.archive.org/web/19970611191211/http://www.faxsav.com/faxsavinternet/html/howmailer.html.

(Continued)

*Primary Examiner* — Melur Ramakrishnaiah
(74) *Attorney, Agent, or Firm* — Kenyon & Kenyon LLP

(57) ABSTRACT

Methods and systems for processing inbound fax messages in an efficient and scalable manner are provided. According to one embodiment, an inbound fax call is received by an Internet fax system. The fax call has a source address, a destination address and a fax signal. The Internet fax system is coupled to a circuit-switched network and a packet-switched network and includes multiple fax processing resources having different configurations, features, capabilities or capacities. One or more desired fax protocol technical call processing capabilities are determined for processing the fax signal based on one or more of the source address, the destination address, the type of network through which the fax call was received and a service provider through which the fax call was received. Then, a fax processing resource that has the desired fax protocol technical processing capabilities is dynamically selected to translate the fax signal into a digital representation.

20 Claims, 12 Drawing Sheets

(51) Int. Cl.
*H04N 1/32* (2006.01)
*H04N 1/333* (2006.01)

(52) U.S. Cl.
CPC ....... *H04N1/32016* (2013.01); *H04N 1/32085* (2013.01); *H04N 1/3209* (2013.01); *H04N 1/33376* (2013.01); *H04N 2201/0065* (2013.01); *H04M 11/00* (2013.01)

(56) References Cited

U.S. PATENT DOCUMENTS

| | | |
|---|---|---|
| 5,224,156 A | 6/1993 | Fuller et al. |
| 5,227,893 A | 7/1993 | Ett |
| 5,267,047 A | 11/1993 | Argenta et al. |
| 5,267,301 A | 11/1993 | Nishii |
| 5,274,635 A | 12/1993 | Rahman et al. |
| 5,289,472 A | 2/1994 | Cho |
| 5,296,934 A | 3/1994 | Ohtsuki |
| 5,307,456 A | 4/1994 | MacKay |
| 5,333,266 A | 7/1994 | Boaz et al. |
| 5,371,885 A | 12/1994 | Letwin |
| 5,394,460 A | 2/1995 | Olson et al. |
| 5,394,522 A | 2/1995 | Sanchez-Frank et al. |
| 5,406,557 A | 4/1995 | Baudoin |
| 5,438,433 A | 8/1995 | Reifman et al. |
| 5,452,289 A | 9/1995 | Sharma et al. |
| 5,461,488 A | 10/1995 | Witek |
| 5,475,738 A | 12/1995 | Penzias |
| 5,479,411 A | 12/1995 | Klein |
| 5,479,491 A | 12/1995 | Garcia et al. |
| 5,483,524 A | 1/1996 | Lev et al. |
| 5,491,800 A | 2/1996 | Goldsmith et al. |
| 5,502,637 A | 3/1996 | Beaulieu et al. |
| 5,524,137 A | 6/1996 | Rhee |
| 5,530,740 A | 6/1996 | Irribarren et al. |
| 5,546,388 A | 8/1996 | Lin |
| 5,548,789 A | 8/1996 | Nakanura |
| 5,552,901 A | 9/1996 | Kikuchi |
| 5,557,798 A | 9/1996 | Skeen et al. |
| 5,559,721 A | 9/1996 | Ishii |
| 5,590,178 A | 12/1996 | Murakami et al. |
| 5,604,737 A | 2/1997 | Iwami et al. |
| 5,619,555 A | 4/1997 | Fenton et al. |
| 5,625,675 A | 4/1997 | Katsumaru et al. |
| 5,629,938 A | 5/1997 | Cerciello et al. |
| 5,630,060 A | 5/1997 | Tang et al. |
| 5,630,061 A | 5/1997 | Richter et al. |
| 5,633,916 A | 5/1997 | Goldhagen et al. |
| 5,634,005 A | 5/1997 | Matsuo |
| 5,647,002 A | 7/1997 | Brunson |
| 5,654,957 A | 8/1997 | Koyama |
| 5,657,461 A | 8/1997 | Harkins et al. |
| 5,664,102 A | 9/1997 | Faynberg |
| 5,675,507 A | 10/1997 | Bobo, II |
| 5,687,220 A | 11/1997 | Finningan |
| 5,689,550 A | 11/1997 | Garson et al. |
| 5,692,039 A | 11/1997 | Brankley et al. |
| 5,694,458 A | 12/1997 | Oakda et al. |
| 5,706,434 A | 1/1998 | Kremen et al. |
| 5,712,901 A | 1/1998 | Meermans |
| 5,712,903 A | 1/1998 | Bartholomew et al. |
| 5,713,019 A | 1/1998 | Keaten |
| 5,715,453 A | 2/1998 | Stewart |
| 5,717,742 A | 2/1998 | Hyde-Thomson |
| 5,724,410 A | 3/1998 | Parvulescu |
| 5,732,219 A | 3/1998 | Blumer |
| 5,737,533 A | 4/1998 | De Hond |
| 5,742,596 A | 4/1998 | Baratz et al. |
| 5,742,906 A | 4/1998 | Foladare et al. |
| 5,751,791 A | 5/1998 | Chen et al. |
| 5,757,510 A | 5/1998 | Oakada |
| 5,771,354 A | 6/1998 | Crawford |
| 5,774,668 A | 6/1998 | Choquier et al. |
| 5,781,614 A | 7/1998 | Brunson |
| 5,805,298 A | 9/1998 | Ho et al. |
| 5,812,278 A | 9/1998 | Toyoda et al. |
| 5,818,836 A | 10/1998 | DuVal |
| 5,819,092 A | 10/1998 | Ferguson et al. |
| 5,825,865 A | 10/1998 | Oberlander et al. |
| 5,838,906 A | 11/1998 | Doyle et al. |
| 5,848,413 A | 12/1998 | Wolff |
| 5,854,893 A | 12/1998 | Ludwig et al. |
| 5,859,967 A | 1/1999 | Kaufeld |
| 5,870,549 A | 2/1999 | Bobo, II |
| 5,872,845 A | 2/1999 | Feder |
| 5,872,926 A | 2/1999 | Levac et al. |
| 5,881,233 A | 3/1999 | Toyoda et al. |
| 5,892,591 A | 4/1999 | Anglin, Jr. et al. |
| 5,892,909 A | 4/1999 | Grasso et al. |
| 5,907,598 A | 5/1999 | Mandalia et al. |
| 5,917,615 A | 6/1999 | Reifman et al. |
| 5,933,412 A | 8/1999 | Choudhury et al. |
| 5,937,041 A | 8/1999 | Cardillo, IV et al. |
| 5,937,162 A | 8/1999 | Funk |
| 5,940,598 A | 8/1999 | Strauss et al. |
| 5,991,292 A | 11/1999 | Focsaneanu et al. |
| 5,999,525 A | 12/1999 | Krishnaswamy et al. |
| 5,999,594 A | 12/1999 | Mizoguchi et al. |
| 5,999,965 A | 12/1999 | Kelly |
| 6,020,980 A | 2/2000 | Freeman |
| 6,023,345 A | 2/2000 | Bloomfield |
| 6,025,931 A | 2/2000 | Bloomfield |
| 6,072,780 A | 6/2000 | Johnson, Jr. et al. |
| 6,073,165 A | 6/2000 | Narasimhan et al. |
| 6,175,619 B1 | 1/2001 | DeSimone |
| 6,185,603 B1 | 2/2001 | Henderson et al. |
| 6,208,638 B1 | 3/2001 | Rieley et al. |
| 6,212,268 B1 | 4/2001 | Nielsen |
| 6,212,550 B1 | 4/2001 | Segur |
| 6,215,858 B1 | 4/2001 | Bartholomew et al. |
| 6,216,173 B1 | 4/2001 | Jones et al. |
| 6,246,983 B1 | 6/2001 | Zou et al. |
| 6,259,533 B1 | 7/2001 | Toyoda et al. |
| 6,263,064 B1 | 7/2001 | O'Neal et al. |
| 6,266,328 B1 | 7/2001 | Johnson, Jr. et al. |
| 6,330,079 B1 | 12/2001 | Dugan et al. |
| 6,339,591 B1 | 1/2002 | Migimatsu |
| 6,341,160 B2 | 1/2002 | Tverskoy et al. |
| 6,350,066 B1 | 2/2002 | Bobo, II |
| 6,351,771 B1 | 2/2002 | Craddock et al. |
| 6,356,356 B1 | 3/2002 | Miller, Jr. et al. |
| 6,359,881 B1 | 3/2002 | Gerszberg et al. |
| 6,370,142 B1 | 4/2002 | Pitcher et al. |
| 6,411,685 B1 | 6/2002 | O'Neal |
| 6,477,240 B1 | 11/2002 | Lim et al. |
| 6,498,797 B1 | 12/2002 | Anerousis et al. |
| 6,510,438 B2 | 1/2003 | Hasegawa |
| 6,564,193 B1 | 5/2003 | Shore et al. |
| 6,564,321 B2 | 5/2003 | Bobo, II |
| 6,597,688 B2 | 7/2003 | Narasimhan et al. |
| 6,625,642 B1 | 9/2003 | Naylor et al. |
| 6,693,724 B1 | 2/2004 | Min |
| 6,693,729 B1 | 2/2004 | Bloomfield |
| 6,707,580 B1 | 3/2004 | Bloomfield |
| 6,711,158 B1 | 3/2004 | Kahane et al. |
| 6,717,938 B1 | 4/2004 | D'Angelo |
| 6,857,007 B1 | 2/2005 | Bloomfield |
| 6,857,074 B2 | 2/2005 | Bobo, II |
| 6,999,478 B2 | 2/2006 | D'Angelo |
| 7,020,132 B1 | 3/2006 | Narasimhan et al. |
| 7,245,611 B2 | 7/2007 | Narasimhan et al. |
| 7,539,291 B2 | 5/2009 | D'Angelo et al. |
| 7,653,185 B2 | 1/2010 | Rebert et al. |
| 7,808,671 B1 | 10/2010 | Kirchhoff et al. |
| 7,836,141 B2 | 11/2010 | Bobo, II |
| 7,869,076 B1 | 1/2011 | Trandal et al. |
| 8,031,360 B2 | 10/2011 | Kirchhoff et al. |
| 8,249,230 B1 | 8/2012 | Watts |
| 8,254,538 B1 | 8/2012 | Watts |
| 2003/0018720 A1* | 1/2003 | Chang et al. .............. 709/206 |
| 2003/0208688 A1 | 11/2003 | Bobo, II |
| 2005/0050349 A1 | 3/2005 | Bobo, II |
| 2005/0063005 A1 | 3/2005 | Phillips et al. |
| 2005/0117183 A1 | 6/2005 | Adlakha et al. |

(56) References Cited

U.S. PATENT DOCUMENTS

| | | | |
|---|---|---|---|
| 2006/0120358 A1* | 6/2006 | Narasimhan et al. | 370/355 |
| 2009/0033976 A1 | 2/2009 | Ding | |
| 2009/0086278 A1 | 4/2009 | Vendrow et al. | |
| 2010/0017864 A1 | 1/2010 | Codignotto | |
| 2010/0097634 A1* | 4/2010 | Meyers et al. | 358/1.15 |
| 2010/0232582 A1 | 9/2010 | Bettis et al. | |
| 2010/0232583 A1 | 9/2010 | Bettis et al. | |
| 2010/0290087 A1* | 11/2010 | Van Hoof et al. | 358/1.15 |
| 2012/0087484 A1 | 4/2012 | Trandal et al. | |
| 2013/0177145 A1 | 7/2013 | Watts | |

FOREIGN PATENT DOCUMENTS

| | | |
|---|---|---|
| GB | 2 157 117 | 10/1985 |
| JP | 406164645 | 6/1994 |

OTHER PUBLICATIONS

FaxSav Incorporated. (Jun. 11, 1997). FaxSav for Internet. FaxMailer FAQs. Retrieved May 3, 2012, from http://web.archive.org/web/19970611191134/http://www.faxsav.com/faxsavinternet/html/faqstart.html.

Non-Final Rejection for U.S. Appl. No. 13/533,049 mailed Jan. 9, 2013.

Non-Final Rejection for U.S. Appl. No. 13/346,456 mailed May 1, 2012.

FAXAGE Internet FAX Service Completes Network Expansion. Dec. 28, 2007. http://www.free-press-release.com/news/200712/1198798649.html.

About FAXAGE. http://www.faxage.com/about.php.

FAXAGE. Email Fax Sending Guide. Jan. 11, 2012 16 pages. http://www.faxage.com/documentation/Email/FAXAGE-email-sending.pdf.

FAXAGE. User's Guide. Jan. 11, 2012. 66 pages. http://www.faxage.com/documentation/UserGuide/FAXAGE.sub.--User.sub.--Guide.pdf.

FAXAGE. Internet Fax API Documentation. Jul. 22, 2011. 35 pages. http://www.faxage.com/documentation/API/Internet-Fax-API-Documentation-FA-XAGE.pdf.

Non-Final Rejection for U.S. Appl. No. 13/565,424 mailed May 22, 2013.

Notice of Allowance for U.S. Appl. No. 13/533,049 mailed Jun. 27, 2013.

* cited by examiner

SCALABLE AND FLEXIBLE INTERNET FAX ARCHITECTURE

CROSS-REFERENCE TO RELATED APPLICATIONS

This application is a continuation of U.S. patent application Ser. No. 13/533,049, filed Jun. 26, 2012, which is a continuation of U.S. patent application Ser. No. 13/346,456, filed on Jan. 9, 2012, now U.S. Pat. No. 8,249,230, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2012-2013, EC Data Systems Inc.

BACKGROUND

1. Field

Embodiments of the present invention generally relate to receiving inbound facsimile messages via email, website and/or custom application programming interface (API) integration. In particular, embodiments of the present invention relate to an improved Internet fax architecture designed for scalability, flexibility and efficient inbound facsimile processing that, among other things, allows multiple inbound addresses to be associated with a single user account of a subscriber, performs load balancing among facsimile processing resources, dynamically selects appropriate facsimile processing resources based on various factors and accommodates facsimile processing resources having different configurations and/or differing capabilities or capacities.

2. Description of the Related Art

Existing Internet fax systems have numerous limitations in terms of the scalability and flexibility of their architectures and user-facing flexibility. The user-facing inflexibility exhibited by existing Internet fax systems results in part from an underlying assumption that a subscriber is an individual user rather than a company having multiple users. As such, attempting to use such Internet fax systems in a multi-user environment typically requires compromise in terms of one or more of expense, features and security. For example, in existing Internet fax systems, the destination address (i.e., the dialed fax number) is assumed to have a one-to-one relationship with a particular end user. This assumption is inconsistent with a typical desired usage model in which multiple members of a project team may all wish to have access to faxes received on a particular inbound fax number. Similarly, administrative staff that support multiple project teams may need to have access to faxes received on multiple inbound fax numbers. While companies have found workarounds to deal with some of the limitations of existing Internet fax systems by sharing user accounts and/or subscribing to more fax numbers than desired, for example, a more flexible architecture that better suits the needs of corporate users is needed.

SUMMARY

Methods and systems are described for processing inbound fax messages in an efficient and scalable manner. According to one embodiment, an inbound fax call is received by an Internet fax system. The inbound fax call has a source address, a destination address and a fax signal. The Internet fax system is coupled in communication with a circuit-switched network and a packet-switched network and includes multiple fax processing resources having different configurations, features, capabilities or capacities. One or more desired fax protocol technical call processing capabilities are determined for processing the fax signal based on one or more of the source address, the destination address, whether the inbound fax call was received via the circuit-switched network or the packet-switched network and a service provider through which the inbound fax call was received. Then, a fax processing resource that has the one or more desired fax protocol technical processing capabilities is dynamically selected to translate the fax signal into a digital representation.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
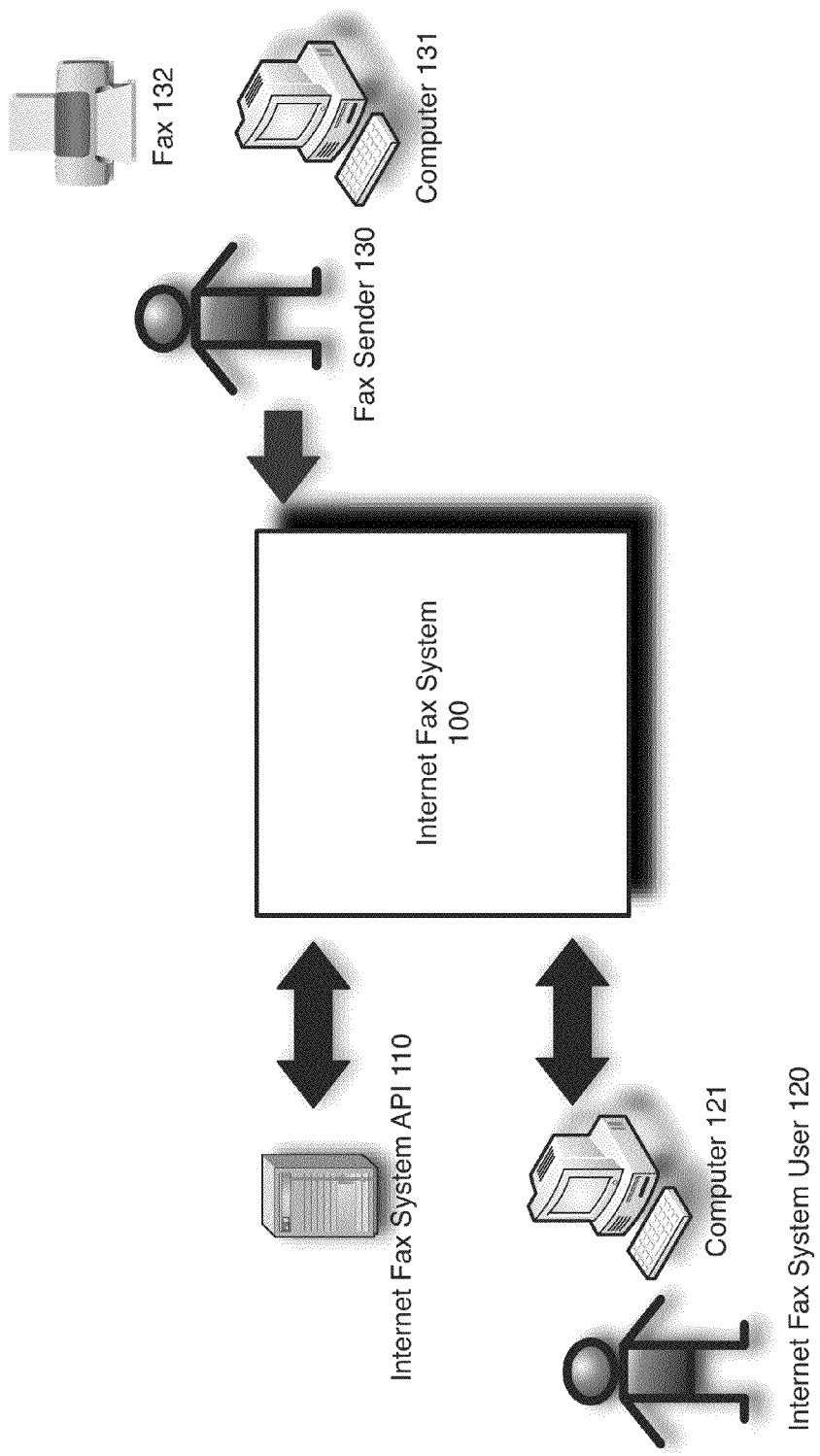
FIG. 1 is a context level diagram illustrating external actors that may interact with an Internet fax system in accordance with an embodiment of the present invention.

Methods and systems are described for processing inbound fax messages in an efficient and scalable manner. According to embodiments of the present invention, an Internet fax system architecture is provided that, among other novel features, performs round-robin load balancing among available facsimile processing resources determined to have appropriate technical call processing capabilities for processing a particular inbound fax call. Embodiments of the present invention also include the notion of one or more intermediate call mediation systems, interposed between one or more telecommunications systems and the facsimile processing resources, identifying and selecting an appropriate facsimile processing resource from among those available based on a combination of two or more of (i) the source address (e.g., automatic number identification (ANI) or caller identification (caller ID, CID)) of the facsimile call and the source's known capabilities/limitations; (ii) whether the facsimile call arrives over a packet-switched or circuit-switched connection, (iii) the service provider through which the facsimile call arrives and (iv) the destination address (e.g., Direct Inward Dialing (DID), Dialed Number Identification System (DNIS) or Calling Identification). In some embodiments, the Internet fax system architecture includes a combination of digital and analog devices and can accommodate facsimile processing resources having different configurations and/or having different capabilities or capacities.

According to one embodiment, an Internet fax system is provided that includes:

a. One or more switches connected to either or both of circuit and packet switched networks for receiving incoming call signals, wherein each incoming call signal includes a destination address and a source address. The destination address may be associated with zero to many user accounts and each user account may be associated with zero to many destination addresses. And wherein each switch redirects the incoming call signal including the destination and source addresses to one of one or more call mediation systems coupled to the switch via circuit or packet switched connections;

b. The call mediation system accepts or rejects the call, and if accepted, selects an appropriate message processing resource to process the call; and c. The message processing resource processes the audio contained within the incoming call signal into a digital representation;

d. The message processing resource consults a centralized data store to determine delivery mechanism;

e. The message processing resource delivers and/or makes available the digital representation of the audio in the incoming call signal, based upon the delivery mechanism determined.

In the context of the aforementioned embodiment, the call mediation system may further be operable to:

a. Upon receiving the incoming call signal, based upon one or more of the source address, destination address and/or the specific circuit or packet switched connection on which the incoming call signal was received either reject or accept the call after consulting a centralized data store to determine whether to accept or reject based on one or more of the source address, the destination address and/or the specific circuit or packet switched connection, sending a busy signal to the source address if rejected and terminating the call;

b. If the call is accepted, select a subset of message processing resources—the "appropriate message processing resources"—which have technical capabilities matching the desired technical capabilities to process the incoming call signal after consulting a centralized data store to determine the desired technical capabilities, based upon a combination of two or more of the source address, destination address and/or the specific circuit or packet switched connection on which the incoming call signal was received; and c. Query each message processing resource within the appropriate messaging processing resources to determine a specific available processing resource within a given appropriate message processing resource; and d. Store the original destination address in the name portion of the calling presentation (ANI) and overwrites the destination address with a fixed destination address that identifies the specific available processing resource for the call to be routed to;

e. Redirect the incoming call signal to a digital access cross connect system (DACS) coupled to the call mediation system via a circuit switched connection and coupled to each specific processing resource on the message processing resource via a circuit switched connection;

f. The DACS redirects the incoming call signal along with the source and destination addresses, to the specific available message processing resource, as specified in the destination address specified by the call mediation system to the message processing resource via a circuit switched connection, translating the ANI into caller ID name (containing the original destination address) and number (containing the source address) fields;

g. The call mediation system implements storage of the specific available message processing resource selected, so as to load balance incoming calls by preferring not to select the same specific available message processing resource until other specific message processing resources within the appropriate message processing resources have been subsequently selected for subsequent incoming call signals; and h. The call mediation system will select a second specific available message processing resource if the first selected specific available messaging processing resource does not answer within a configured timeout period, re-write the destination address to accommodate the new selection, and redirect the incoming call signal to said second specific available message processing resource through a DACS as specified in 'f & g' above;

i. The call mediation system remains in the call path after redirecting the message processing resource, such that it records the start and stop time, specific resource selected and result (normal hangup, problem, etc.) of the incoming call signal for both billing and accounting and troubleshooting purposes;

In the context of one or more of the aforementioned embodiments, the message processing resource may be operable to:

a. Upon completion of the reception of the audio of the incoming call signal and converting said audio to a digital representation, retrieve the original source and destination addresses of the call signal from the caller ID fields, consult a centralized data store to determine the preferred digital representation format based upon first the destination address alone, then the preferences of any user accounts that may be associated with the destination address, and convert the digital representation to the appropriate format with the possibility to store and subsequently present multiple differing formats to different user accounts;

b. Upon completion of reception of the audio of the incoming call signal and converting said audio to a digital representation and potentially converting said digital representation to a different digital format, consult a centralized data store to determine the delivery mechanism, which may be one or more of:

1. Via email to one or more email addresses associated with user accounts that are in turn associated with the particular destination address of the incoming call signal—assuming user accounts are associated with the particular destination address, which is not required—wherein the delivery mechanism may specify whether:

i. To deliver all or part of the digital representation of the audio attached to the email to the user's email address, or
ii. To deliver only a notification to the email address with none of the digital representation attached, or
iii. To encrypt the digital representation prior to delivering it.

Each of i.-iii. above being separately and uniquely configurable for each of the one or more user accounts that may be associated with the particular destination address.

2. Stored in a destination address specific area, which is presented via a website to which zero or more users may have access for retrieval via HTTP or HTTPS. A central data store is used for storage of the metadata (source address, destination address, date/time message received, etc.) that is then used to retrieve the digital representation of the message when an authorized user accesses the destination address specific area and requests the message via an HTML interface and the central data store metadata is used to generate the HTML interface as well as to determine which of a plurality of possible digital representation formats to present a particular user with.
3. Stored in a data store which is queryable by a downstream user system (outside of the System) via a standardized application programming interface over HTTP or HTTPS, the System implementing the appropriate application programming interface to enable system to system communication via HTTP or HTTPS methods.
4. Via a packet-switched message to a downstream user system (outside of the System) the System implementing the appropriate application programming interface to enable system to system communication via HTTP or HTTPS comprising at least:
  i. The source address
  ii. The destination address
  iii. The date and time the incoming call signal was received
  iv. A unique identifier allowing for retrieval of the digital representation of the call signal by the downstream system In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

For simplicity and sake of brevity, various embodiments described herein focus on inbound fax processing and delivery of received faxes to subscribers; however, it is to be noted that the Internet fax system may also be capable of facilitating sending of outbound fax messages on behalf of subscribers as well.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "connected" or "coupled" and related terms are used in an operational sense and are not necessarily limited to a direct connection or coupling.

The phrases "facsimile call" or "fax call" generally refer to a call carried over a circuit-switched network (e.g., the public switched telephone network (PSTN)) or a VoIP call carried over a packet-switched network (e.g., the Internet) from a device intending to transmit a facsimile to a particular destination phone number.

The phrases "facsimile processing resource" and "fax processing resource" generally refer to a device capable of answering a facsimile call, establishing a facsimile protocol communication with the caller, receiving facsimile data in an audio format and translating the received audio into a digital representation. A non-limiting example of a facsimile processing resource is a fax server or a subset of resources associated with a fax server. According to embodiments of the present invention, there is no requirement that all fax processing resources be configured the same and/or have the same capabilities or capacity. In one embodiment, such flexibility is enabled by the fact that an appropriate fax processing resource of a set of available fax processing resources may be determined on-the-fly responsive to receipt of an incoming fax call.

The phrases "facsimile signal" or "fax signal" generally refer to a digital representation of audio information encoding a facsimile message. According to embodiments of the present invention, incoming fax signals may be received over a circuit-switched network (e.g., the public telephone network) or a packet-switched network (e.g., the Internet via Voice over Internet Protocol (VoIP)) and delivery of the fax may be to a packet-switched network (e.g., an internal network connected to the Internet). In one embodiment, incoming fax signals contain information regarding the type of network (e.g., packet-switched or circuit-switched), the service provider, a source address and a destination address, thereby allowing processing of the incoming fax signals to be influenced by configuration and/or preference information associated with one or a combination of the source address, the destination addresses, the network and the service provider. For example, the source address and its known capabilities and/or whether the facsimile call arrived over a packet-switched or circuit-switched connection may be used to assign the facsimile call to a particular facsimile processing resource to compensate for the presence or absence of packet delays and jitter. Similarly, the particular source address and destination address combination may have been configured to deliberately use a given type of facsimile processing resource based on known limitations and/or preferences of both the source and destination.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

FIG. 1 is a context level diagram illustrating external actors that may interact with an Internet fax system 100 in accordance with an embodiment of the present invention. In embodiments of the present invention, Internet fax system 100 allows users associated with a subscriber account to receive fax messages without necessarily owning a fax machine via a web site, fax to email and/or application programming interface (API) fax methods. Embodiments of the present invention support the notion of a truly multi-user system where the subscriber may be, but is not assumed to be an individual user and is typically an organization having 1 to n users each of which may have access to faxes received on multiple inbound fax numbers. In accordance with various embodiments of the present invention, the notion of a user is effectively decoupled from the destination address (e.g., the inbound fax number) such that a destination address can support 0 to n users and a user can be associated with 0 to n destination addresses.

Each subscriber account may have one or more users and one or more associated fax numbers. According to one embodiment, flexible user configuration settings allow security options, delivery preferences and access privileges to be established with finer resolution than existing fax services. For example, any inbound fax number associated with a subscriber account can be set up to deliver received faxes to any or no user account associated with the subscriber account. As such, multiple inbound fax numbers can be associated with a single user or multiple user accounts rather than being constrained to a one-to-one relationship. For purposes of efficiency, defaults may be established at an account level and overridden, if desired, at the user level. For example, by default all faxes received by a subscribing enterprise may be stored as portable document format (PDF) files; however, a particular user may specify that faxes delivered to him/her be stored in another file format, e.g., tagged image file format (TIFF).

Internet fax system 100 receives and processes inbound fax calls on behalf of subscribers and stores fax images for later retrieval by subscribers and/or forwards the fax images to one or more email addresses designated by the subscribers. Anyone with a fax machine (subscriber or non-subscriber) can dial a subscriber's fax number and Internet fax system 100 will receive the fax, convert/store the fax in a configurable format for later retrieval via the web and/or email the fax to one or more email addresses that can be configured on a per-fax-number basis. As described further below, embodiments of the present invention also allow for data store queries via an API over Hypertext Transport Protocol (HTTP) or HTTP secure (HTTPS) that allows programmers to build fax receive capabilities into their applications.

According to the present example, Internet fax system 100 interfaces with Internet fax system APIs, such as Internet fax system API 110, Internet fax system users associated with a subscriber account, such as Internet fax system user 120, and fax senders, such as fax sender 130.

Internet fax system user 120 may receive inbound fax messages directed to one or more fax numbers associated with an Internet fax subscription via any Internet connected device, such as computer 121, a smartphone (not shown) or the like. As described further below, Internet fax system user 120 may receive faxes as email attachments, as secure download links embedded within email messages or download them from a web site associated with Internet fax system 100. To the extent he/she is authorized to do so, Internet fax system user 120 may also make administrative changes to account settings via the web site, including, but not limited to associating email addresses with fax numbers, specifying fax delivery preferences, designating user access permissions and the like.

Fax sender 130 may send faxes to subscribers of Internet fax system 100 via a dedicated fax machine 132, computer 131, multifunction/all-in-one printer (not shown) or other fax-capable device (not shown) just as he/she would send faxes to non-subscribers. Fax sender 130 need not be a subscriber of Internet fax system 100 to send faxes to a subscriber, such as Internet fax system user 120.

Internet fax system API 110 may represent a standardized API associated with Internet fax system 100 or a custom API developed to API specifications established by the owner/operator of Internet fax system 100. Internet fax system API 110 may provide capabilities that an application programmer can use to integrate fax capabilities into their applications utilizing Internet fax system 100 as a backend, for example. In one embodiment, the integration is accomplished via HTTP or HTTPS POST operations.

Depending upon the particular implementation, Internet fax system API 110 may provide operations to support fax sending and receiving, call detail record collection and automated number provisioning and de-provisioning. Additional details regarding an exemplary set of operations and related variables for an internet fax system API are described in Appendix.

Figure 2:
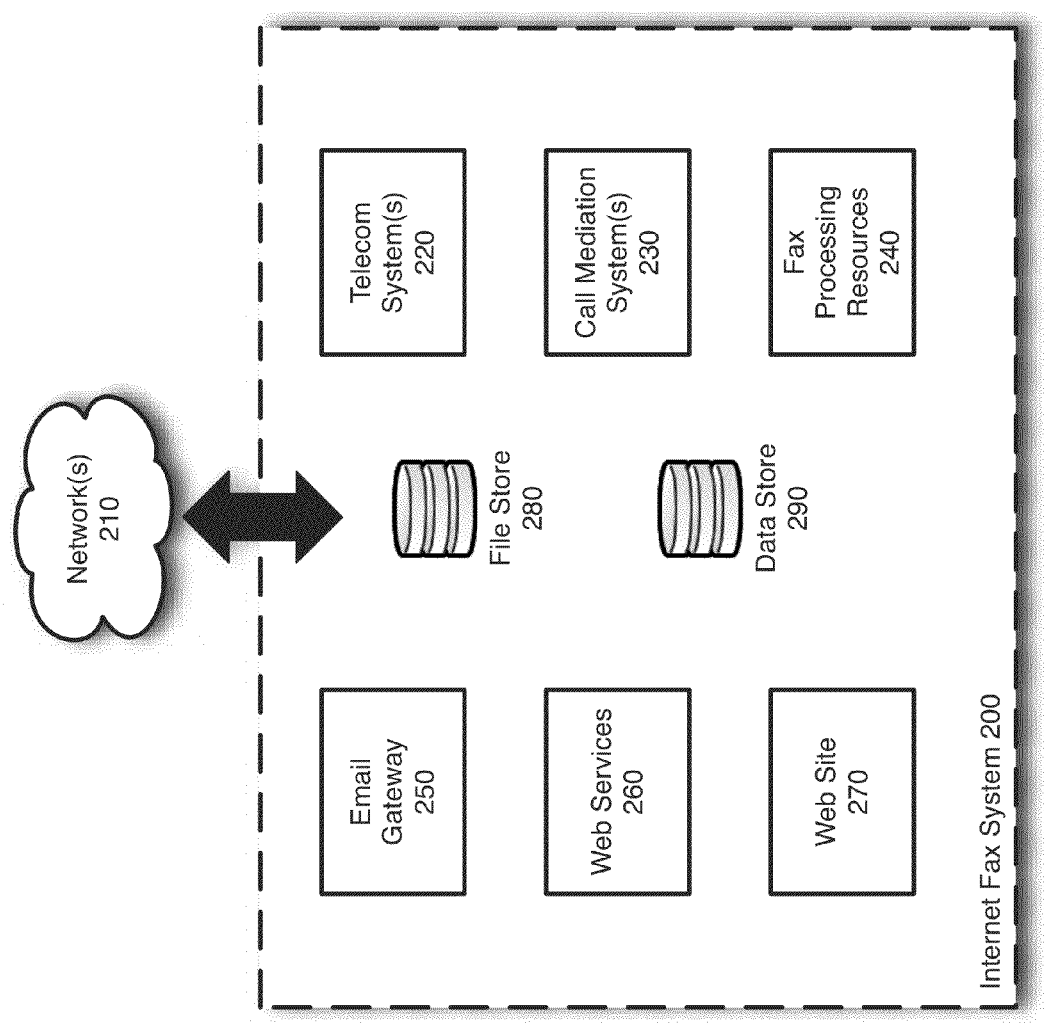
FIG. 2 is a system level diagram conceptually illustrating an architecture of an Internet fax system in accordance with an embodiment of the present invention.

FIG. 2 is a system level diagram conceptually illustrating an architecture of an Internet fax system 200 in accordance with an embodiment of the present invention. According to the present example, Internet fax system 200 is coupled to one or more networks 210 through which inbound faxes may be received and delivered and outbound faxes may be uploaded and transmitted.

In the exemplary simplified architecture depicted, Internet fax system 200 includes one or more telecommunications systems 220, one or more call mediation systems 230, fax processing resources 240, an email gateway 250 a web services interface 260, a web site 270, a file store 280 and a data store 290 interconnected via an appropriate telecommunications signaling network and an Internet Protocol (IP) network.

According to one embodiment, telecommunications system(s) 220 are operable to receive incoming fax calls and pass accepted fax calls to a call mediation system of call mediation system(s) 230. In one embodiment, telecommunications system(s) 220 perform round-robin load balancing among the call mediation system(s) 230. Upon call completion, telecommunications system(s) 220 may record telephony (ISDN) information and call accounting information in data store 290 for billing purposes and/or troubleshooting.

In one embodiment, call mediation system(s) 230 are logically interposed between telecommunications system(s) 220 and fax processing resources 240. Call mediation system(s) 230 receive incoming call information (e.g., caller ID and called number), determine custom call handling based thereon, select an appropriate fax processing resource of those available within fax processing resources 240 and redirect inbound fax calls to the selected fax processing resource. As described further below, load leveling may also be performed at the call mediation layer by preferring not to select the same specific available fax processing resource until all other available and appropriate fax processing resources of fax processing resources 240 have been selected to process an inbound fax call. In some embodiments, call mediation system(s) 230 sit in the path of inbound fax calls and wait for call completion to allow call mediation system(s) 230 to record call accounting for billing in a separate database (not shown). To the extent not performed at the telecommunications system layer, call mediation system(s) 230 may also record telephony (ISDN) information and call accounting information in data store 290 to facilitate troubleshooting.

Fax processing resources 240 are operable to receive incoming call information from call mediation system(s) 230, set custom parameters based on information passed, such as speed/protocol, capabilities, etc., receive inbound fax signals, convert audio fax signals to appropriate digital image form and deliver or otherwise make available the resulting fax messages to one or more users associated with the subscribers to which the inbound faxes are directed (e.g., by storing the fax messages in a destination address-specific storage area within file store 280 for subsequent web retrieval and/or by creating an email message directed to one or more users according to the subscriber's administrative account settings).

According to one embodiment, email gateway 250 is a simple relay operable to receive and send email messages created by fax processing resources 240. In such an embodiment, before sending an email message to email gateway 250 that is to be relayed to a subscriber, fax processing resources 240 may apply custom messaging to the email. For example, fax processing resource 240 may make the email message appear to be from a customer's service provider that operates as a reseller of the Internet fax service or fax processing resource 240 may reformat data in the notification based on customer defined preferences. In alternative embodiments, email gateway 250 may include more intelligence and perform some portion of email creation, customization and/or reformatting.

Web services 260 supports API-based receiving of fax messages, wherein the interaction can be with a program on a user system, as opposed to manual downloading of fax messages by an individual using a web browser as required by existing Internet fax systems, such as that described in U.S. Pat. No. 6,350,066 and its progeny. According to one embodiment, web services 260 is operable to receive request for download of received faxes (e.g., by unique fax ID recorded in data store 290 by fax processing resources 240) via an API call and return fax images to the requesting system. For example, web services 260 may retrieve the fax image location from data store 290, retrieve the fax image from file store 280 and send the fax image to the requesting system over a secure sockets layer (SSL) connection. Further details regarding an exemplary set of operations that may be automated via web services 260 are provided in Appendix.

Web site 270 is operable to receive and process user requests relating to received faxes. For example, responsive to a user logging into web site 270 and navigating to the receive faxes page, web site 270 may query data store 290 and present the user with an interface, per receiving fax number within the subscriber account with which the logged in user is associated to which the user has access, that lists received faxes. The user may then select a fax to download and cause web site 270 to retrieve the corresponding fax image from file store 280 for download to the user's client system via SSL. In some embodiments, web site 270 may further support the capability for users to rename received faxes to something meaningful to them and/or to create logical "folders" and move faxes' storage presentation from the destination to the logical folder.

File store 280 represents a shared storage resource accessible by fax processing resources 240, email gateway 250, web services interface 260 and web site 270 for storing and accessing digital representations of fax messages. According to one embodiment, file store 280 is simply a disk with no processing other than storage access logic. According to one embodiment, file store 280 is a fax image database implemented within a network attached storage (NAS) device, such as a NetApp NAS filer available from NetApp, Inc.

Data store 290 represents storage for accounting, billing, features and metadata associated with received fax messages. According to one embodiment, data store 290 is a Solaris x86-based workstation running an open source database, such as MySQL.

The centralization of configuration and user information in the manner described above eliminates duplication of such information among inbound fax servers as suggested by prior Internet fax system architectures, such as the architecture described in U.S. Pat. No. 6,208,638. The centralization of storage on a network-shared storage device also eliminates the need for redirecting requests for faxes to a system or program separate and apart from the one (e.g., the web server) the user is communicating with initially to make the request as suggested by prior Internet fax system architectures, such as the architecture described in U.S. Pat. No. 6,350,066. This enhances scalability, flexibility and reliability of the Internet fax system by, among other things, removing the possibility to redirect a request to a server having a problem and in general results in fewer "moving parts" and fewer opportunities for failure.

Figure 3:
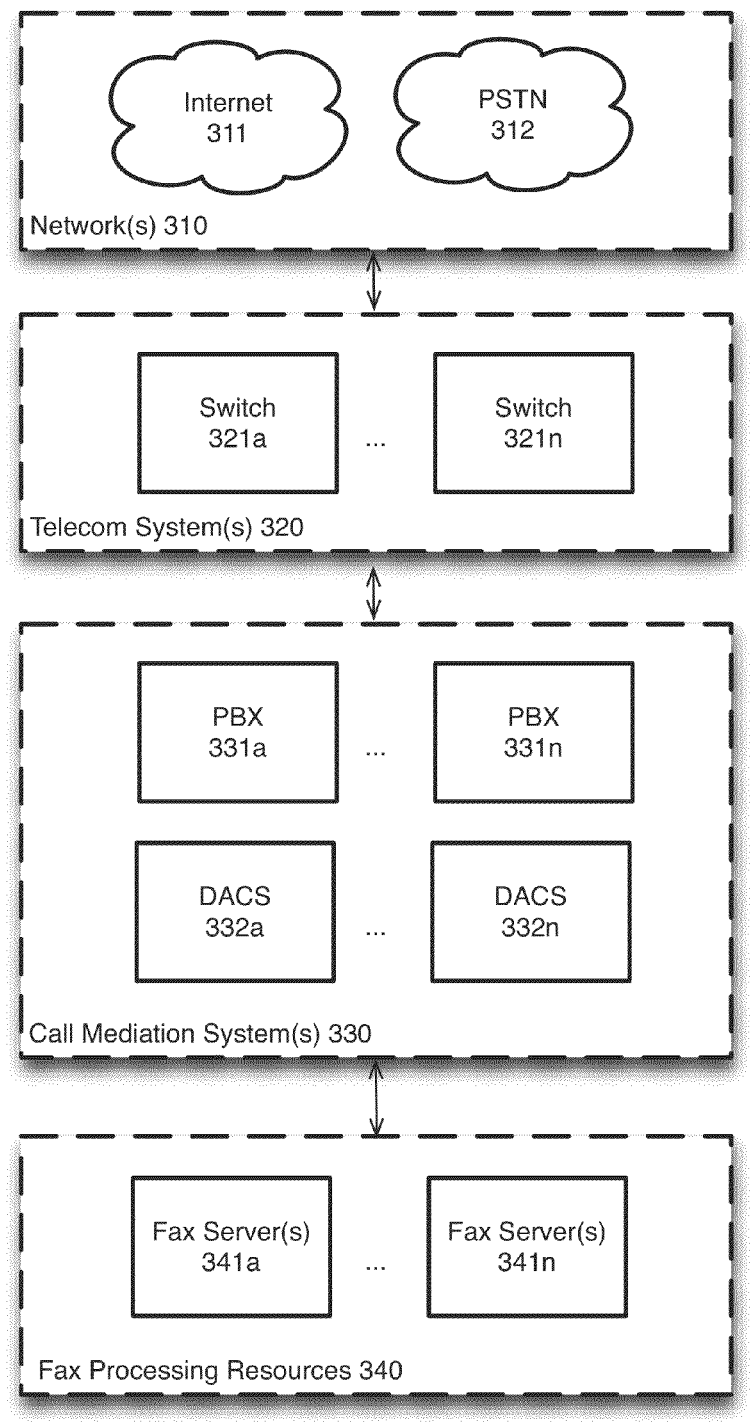
FIG. 3 is block diagram illustrating various components of an Internet fax system architecture in accordance with an embodiment of the present invention.

FIG. 3 is block diagram illustrating various components of an Internet fax system architecture 300 in accordance with an embodiment of the present invention. Embodiments of the present invention seek to provide redundancy and scalability based on an active-0/active-n setup of multiple fax servers, PBXs, etc. that are all essentially identical, such that a given fax server does not have to be associated with a "backup" fax server that is used if it goes down as suggested by prior Internet fax system architectures, such as the architecture described in U.S. Pat. No. 6,208,638. Instead, in accordance with embodiments of the present invention, an n-way pool of possible fax servers and modems are available for use and which may be sub-divided by the technical capabilities of each.

In the present example, as in the example architecture discussed with reference to FIG. 2, Internet fax system architecture 300 includes one or more telecommunications systems 320, one or more call mediation systems 330 and fax processing resources 340 coupled to one or more networks 310.

According to the architecture depicted, network(s) 310 may include both a packet-switched network, such as the Internet 311, and a circuit-switched network, such as the public switched telephone network (PSTN) 312. As such, Internet fax system architecture 300 may receive inbound fax calls over packet-switched or circuit-switched connections.

According to the present example, telecommunications system(s) 320 include one or more switches 321a-n. Switches 321a-n may be connected to the Internet via Ethernet and connected to the PSTN 312 via dedicated, high bandwidth circuits (e.g., DS3 and/or DS1 lines). In one embodiment, switches 321a-n are high-capacity access servers providing both packet and time-division multiplexing (TDM) switching.

Examples of suitable switches include, but are not limited to, the Cisco AS5850 Universal Gateway, the Cisco AS5800 Access Server, the Cisco AS5400 Universal Gateway, the Cisco AS5350 Universal Gateway and the Cisco AS5300 Universal Access Server. Depending upon the particular implementation, telecommunications system(s) 320 may comprise a single switch or multiple redundant switches in which one of the switches 321a-n is an active primary switch and the others are active standby switches, which can take over for the primary in the event of a failure. In alternative embodiments, it is also possible to have an active/active redundant switch architecture in which multiple circuits from PSTN 312 and/or Internet 311 provide the same services and the circuits are split between multiple switches 321a-n that are interconnected in a mesh for redundancy and/or increased capacity.

Call mediation system(s) 330 may include one or more PBXs 331a-n. In one embodiment analog fax processing resources are supported by providing associated digital access cross connects (DACS) 332a-n. PBXs 331a-n may be implemented by installing and running an open source PBX software package on a server. For example, a non-limiting example of a suitable PBX is a Linux server running Asterisk. Alternatively, PBXs available from Cisco or Avaya may be used. According to one embodiment, DACS 332a-n provide DS1/DS0 (0/1) cross-connect functionality and may be one of Adtran's ATLAS series of enterprise integrated access devices, such as the ATLAS 550 series, ATLAS 800 series, Tellabs Titan series DACS or the like.

As described in further detail below, in various embodiments of the present invention, the destination address associated with an inbound fax call may be remapped in a novel manner to force it to be routed to a particular selected analog modem on a fax server where the destination (DID) is changed by the call mediation system to a fixed DID that represents the modem to a DACS in front of the fax server. The destination address is moved into the caller ID name field, while the caller ID number remains the source address.

According to the present example, fax processing resources 340 include one or more fax servers 341a-n. Each of the fax servers 341a-n may include one or more analog fax modems, digital fax boards and/or soft modems (modems implemented in software). According to one embodiment, fax servers 341a-n each have 24 ports and those ports are connected to the 24 ports of a single DACS of DACS 332a-n. Those of ordinary skill in the art will appreciate there are a variety of possible combinations of DACS to fax server connections/configurations. For example, in alternative configurations, each DACS 332a-n may support multiple fax servers—theoretically as many fax servers as it has ports by connecting each port of the DACS to a single port of a fax server. According to one embodiment, fax servers 341a-n include Linux servers running open source fax server software, such as HylaFAX. As described further below, embodiments of the present invention accommodate facsimile processing resources having different configurations and/or differing capabilities or capacities by dynamically selecting at the call mediation layer appropriate facsimile processing resources based on various factors, e.g., (i) the source address (e.g., automatic number identification (ANI) or caller identification (caller ID, CID)) of the inbound fax call and the source's known capabilities/limitations; (ii) whether the inbound fax call arrived over a packet-switched or circuit-switched connection, (iii) the telecommunications service provider through which the inbound fax call arrived and (iv) the destination address (e.g., Direct Inward Dialing (DID), Dialed Number Identification System (DNIS) or Calling Identification). As such, an Internet fax system architecture in accordance with embodiments of the present invention allows for selection of differing capabilities for inbound modems.

Figure 4:
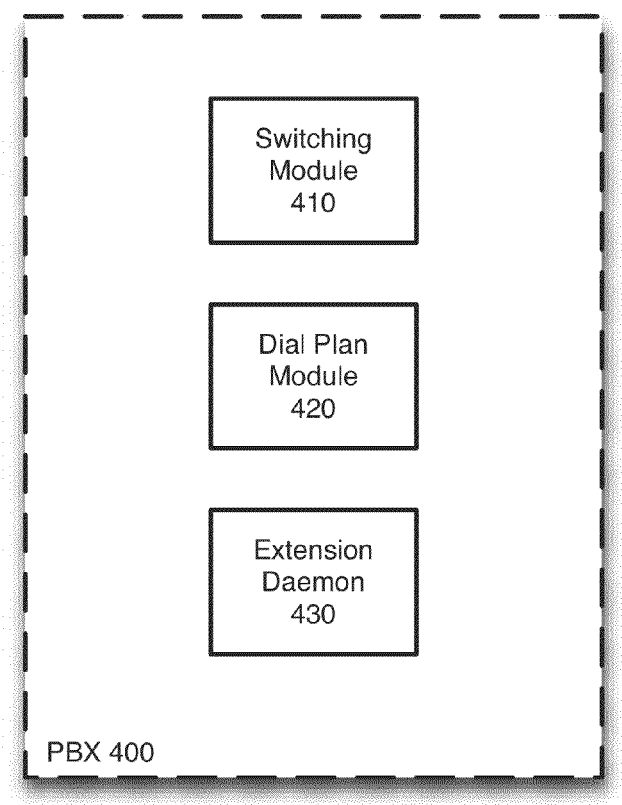
FIG. 4 is block diagram illustrating functional units of a private branch exchange (PBX) in accordance with an embodiment of the present invention.

FIG. 4 is block diagram illustrating functional units of a PBX 400 in accordance with an embodiment of the present invention. In the context of the present simplified example, PBX 400 includes a switching module 410 a dial plan module 420 and an extension daemon 430.

According to one embodiment, switching module 410 is responsible, under control of dial plan module 420, for outdialing on a particular circuit or channel to a destination, then bridging the source call with the destination when the destination answers. Switching module 410 is also typically responsible for reporting the event that the destination answers and/or does not answer to dial plan module 420 for further processing when such event occurs.

Dial plan module 420 is generally responsible for choosing whether to accept or reject a particular inbound fax call, based on source, destination, carrier received on, etc. If the call is accepted, the dial plan module 420 asks extension daemon 430 for an appropriate destination extension to which to switch the call and requests that switching module 410 switch the call to the destination received from extension daemon 430. If switching module 410 indicates that the destination does not answer, then the dial plan module 420 may request extension daemon 430 to identify an alternative destination and attempt to switch the call to the alternative destination until the selected destination answers. Dial plan module 420 may also record call accounting information at call completion for billing purposes.

Extension daemon 430 is responsible for receiving a request for a fax call to be switched from dial plan module 420. The request may include the source address, the destination address and information regarding the carrier/technology from which the call originated. Based on the source, destination, carrier/technology the call comes in on, etc., extension daemon 430 selects a subset of appropriate fax call resources (with the "right" or "desired" capabilities) from all fax call resources. As such, an Internet fax system architecture implemented in accordance with embodiments of the present invention allows for selection of differing capabilities for inbound modems. In any event, from the appropriate fax call resources, extension daemon 430 selects the "next" (according to a round-robin algorithm, for example) fax processing resource that should be tried/used. Extension daemon 430 then returns an extension associated with the selected fax call resource to dial plan module 420.

Figure 5:
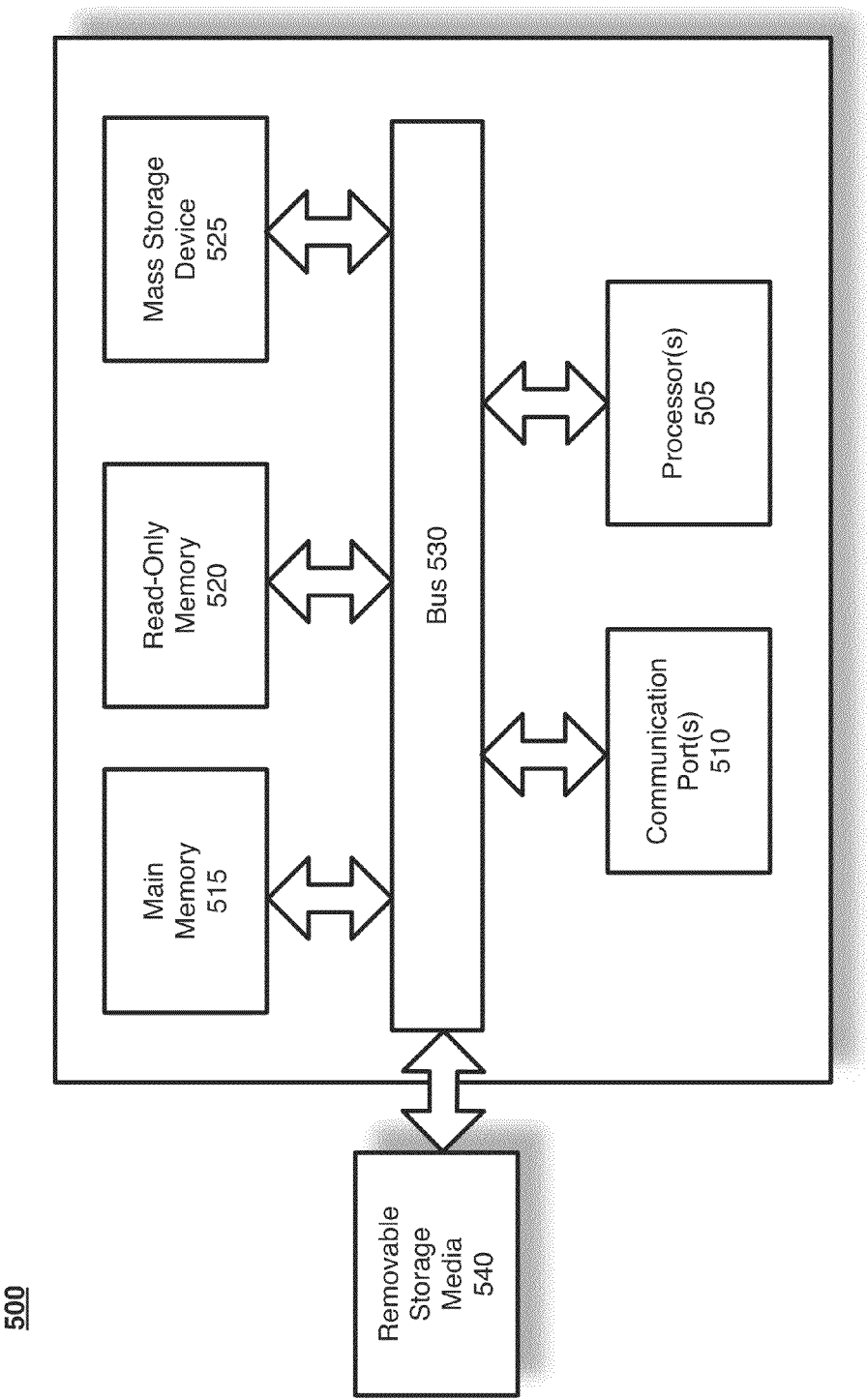
FIG. 5 is an example of a computer system with which embodiments of the present invention may be utilized.

FIG. 5 is an example of a computer system with which embodiments of the present invention may be utilized. Embodiments of the present invention include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As such, FIG. 5 is an example of a computer system 500, such as a Linux-based fax server, a Linux-based PBX, a Solaris x86 database server or the like, upon which or with which embodiments of the present invention may be employed.

According to the present example, the computer system includes a bus 530, one or more processors 505, one or more communication ports 510, a main memory 515, a removable storage media 540, a read only memory 520 and a mass storage 525.

Processor(s) 505 can be any future or existing processor, including, but not limited to, an Intel® Itanium® or Itanium 2 processor(s), or AMD® Opteron® or Athlon MP® processor(s), or Motorola® lines of processors. Communication port(s) 510 can be any of an RS-232 port for use with a modem based dialup connection, a 10/100 Ethernet port, a Gigabit port using copper or fiber or other existing or future ports. Communication port(s) 510 may be chosen depending on a network, such as a Local Area Network (LAN), Wide Area Network (WAN), or any other network to which the computer system 500 connects. For example, in the context of a PBX, communication port(s) 510 may include communication cards supporting Ethernet or DS1/DS3 types of connections and in the context of a fax server, such as one of fax servers 341a-n, communication port(s) 510 may include Ethernet, DS0, T1/DS1 (such as ISDN PRI) or fractional T1/DS1 or digital DS0 (such as ISDN BRI).

Main memory 515 can be Random Access Memory (RAM), or any other dynamic storage device(s) commonly known in the art. Read only memory 520 can be any static storage device(s) such as Programmable Read Only Memory (PROM) chips for storing static information such as start-up or BIOS instructions for processor 505.

Mass storage 525 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 530 communicatively couples processor(s) 505 with the other memory, storage and communication blocks. Bus 530 can include a bus, such as a Peripheral Component Interconnect (PCI)/PCI Extended (PCI-X), Small Computer System Interface (SCSI), USB or the like, for connecting expansion cards, drives and other subsystems as well as other buses, such as front side bus (FSB), which connects the processor(s) 505 to system memory.

Optionally, operator and administrative interfaces, such as a display, keyboard, and a cursor control device, may also be coupled to bus 530 to support direct operator interaction with computer system 500. Other operator and administrative interfaces can be provided through network connections connected through communication ports 510.

Removable storage media 540 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

In some embodiments, a computer system, such as computer system 500, is configured to operate as one or more of PBXs 331a-n. For example, as described above, any or all of PBXs 331a-n may be implemented as a Linux server running an open source PBX software package, such as Asterisk. In some embodiments, a computer system, such as computer system 500, is configured to operate as one or more of fax servers 341a-n. For example, as described above, any or all of fax servers 314a-n may be implemented as a Linux server running open source fax server software, such as HylaFAX. In some embodiments, a computer system, such as computer system 500, is configured to support one or more databases, such as a billing database and/or data store 290. For example, as described above, any or all of the databases described herein may be implemented within a Solaris x86-based workstation running an open source database, such as MySQL. As those of ordinary skill in the art will appreciate, the computer system components described above are meant only to exemplify various possibilities. In no way should the aforementioned exemplary computer system limit the scope of the invention.

Figure 6:
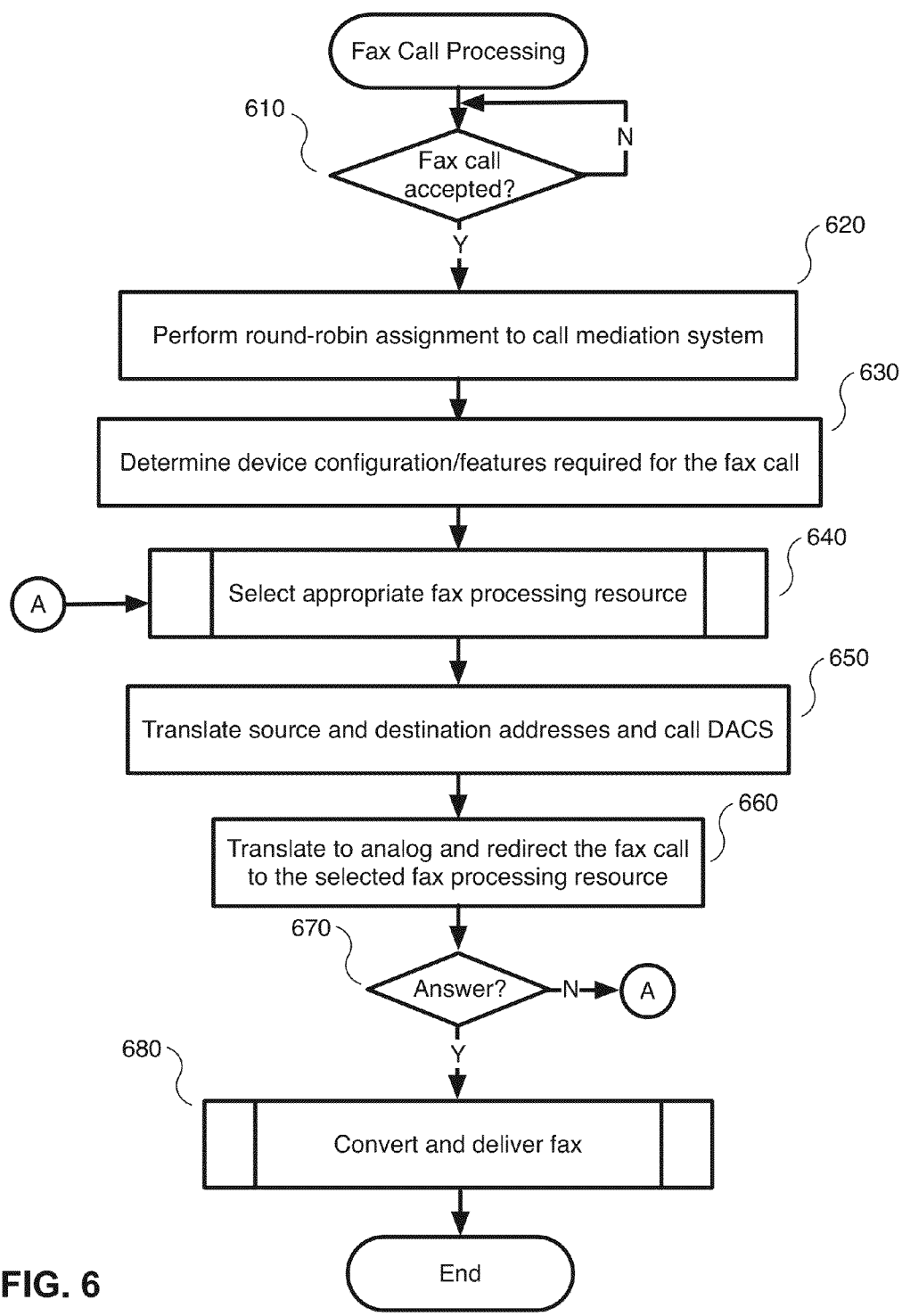
FIG. 6 is a flowchart illustrating fax call processing in accordance with an embodiment of the present invention.

FIG. 6 is a flowchart illustrating fax call processing in accordance with an embodiment of the present invention. At decision block 610, a determination is made regarding whether an inbound fax call has been accepted by the Internet fax system, e.g., by telecommunications system(s) 220 of Internet fax system 200. If so, then fax call processing continues with block 620; otherwise, fax call processing loops back to decision block 610 until an inbound fax call is received.

At block 620, the inbound fax call is assigned to a call mediation system. In one embodiment, a switch, such as switch 321a, performs round-robin load balancing among multiple PBXs, such as PBX 331a-n. In such an embodiment, the switch is stateful as it keeps state regarding which PBX to use next, for example. Those skilled in the art will appreciate that various other load distribution techniques are available. For example, in alternative embodiments, the inbound fax call may be assigned to the least recently used PBX, a randomly selected PBX or PBX having the most available capacity. If guaranteed or differentiated quality of service is offered to subscribers, weighted round-robin or weighted fair queuing may be implemented.

At block 630, device configuration/features required for processing the inbound fax call are determined. According to one embodiment, the PBX to which the inbound fax call has been assigned performs a source address and subscriber account lookup (based on the destination address) in data store 290 to identify configurations or known capabilities/limitations associated with the source and/or the destination of the inbound fax call. For example, the fax transmission source of the inbound call may be known to be capable of high-speed transmission and therefor indicate a preference for a higher speed fax server. Alternatively, the fax transmission source may be known for producing higher than average transmission errors or known to be using an older fax standard, thus indicating a preference for a lower speed fax server.

The PBX may also use information regarding the service provider and/or whether the inbound fax call arrived over a packet-switched or circuit-switched connection to determine configuration/features required for processing the inbound fax call. Based on the various factors, it may be determined, for example, that a fax server that is more tolerant of delays is a feature desirable for processing the particular inbound fax call. Those skilled in the art will appreciate an appropriate data structure can be created and maintained to store and prioritize configuration/feature information based on the above-referenced factors and/or others. For example, a configuration/feature preference associated with a particular network connection (e.g., packet-switched connection) may override and take precedence over a configuration/feature preference associated with one or both of the source address and the destination address of the inbound fax call at issue.

In some embodiments, an inbound fax call may be accepted or rejected by the PBX without performing any further processing based on various factors. For example, the PBX may reject an inbound fax call according to the subscriber's subscribed capacity and how many calls are currently in progress to one or more destination addresses associated with the subscriber. Calls can also be rejected based on the subscriber configuring source addresses (e.g., known fax spammers) from which calls are not to be accepted.

According to one embodiment, as a precondition to performing configuration/feature determination, the PBX may check whether the subscriber to which the inbound fax call is directed is within its subscribed capacity limits (e.g., number of received faxes, total faxes, number of concurrent inbound fax calls, number of received fax pages and/or total fax pages within a predetermined time frame, long distance fees, bandwidth, storage, etc.). If the subscriber is determined to be at capacity, then a busy signal can be returned to the caller. Alternatively or additionally, an inbound fax call may be blocked (by sending a busy signal) at the PBX without passing the call to a fax server based on the source address, the destination address or a combination of the two addresses. Source-address-only blocking may be performed system wide for all subscribers and all destinations. In one embodiment, an inbound fax call may be blocked based on a combination of the source address and the subscriber. That is, subscribers of the Internet fax system may be provided with the capability to block a source to just one of their numbers or to all of their numbers, including numbers to which they subscribe in the future; the block being based on source/subscriber combination accomplishes this. In one embodiment, the PBX remains in the path of the call and waits for the call to be completed so it can record call accounting for billing in a billing database. In one embodiment, at the time of the inbound call event and prior to call completion, source and destination address configurations are checked, but the centralized resource for user account information is not.

At block 640, to the extent the inbound fax call is to be passed to a fax processing resource, an appropriate fax processing resource is selected. According to one embodiment, appropriate fax processing resource selection proceeds as described with reference to FIG. 7.

At block 650, the source and destination addresses associated with the inbound fax call are translated and the appropriate DACS is called. According to one embodiment, the PBX places the DNIS into the calling name and changes the DNIS to the extension of the selected fax processing resource prior to calling the DACS. Those skilled in the art will be familiar with various conventions/schemes for assigning extensions to DACS and fax servers in the exemplary architecture depicted in FIG. 3. In one embodiment, each PBX is associated with one or more DACS each having 24 fax ports and the extensions have the following format:

303303DDFF

Where:

the first six digits (i.e., 303303) are hard-coded

DD represents the DACS with which the selected fax server is associated

FF represents the fax port on the DACS to which the selected fax server is connected.

At block 660, the inbound fax call is translated to analog and redirected to the selected fax processing resource. In one embodiment, the DACS redirects the incoming call signal along with the source and destination addresses, to the selected fax processing resource, as specified in the destination address specified by the call mediation system to the message processing resource via a circuit switched connection, translating the ANI into caller ID name (containing the original destination address) and number (containing the source address) fields. According to one embodiment, the DACS redirects the inbound fax call to the port number represented by the last two digits of the DNIS of the inbound fax call.

At decision block 670, it is determined whether the selected fax processing resource answered the call. If so, then fax call processing continues with block 680; otherwise, fax call processing loops back to block 640 and a different fax processing resource is selected.

At block 680, the inbound fax signal is converted to a fax image and delivered and fax call processing is complete. According to one embodiment, conversion and delivery of the fax proceeds as described with reference to FIG. 8.

Figure 7:
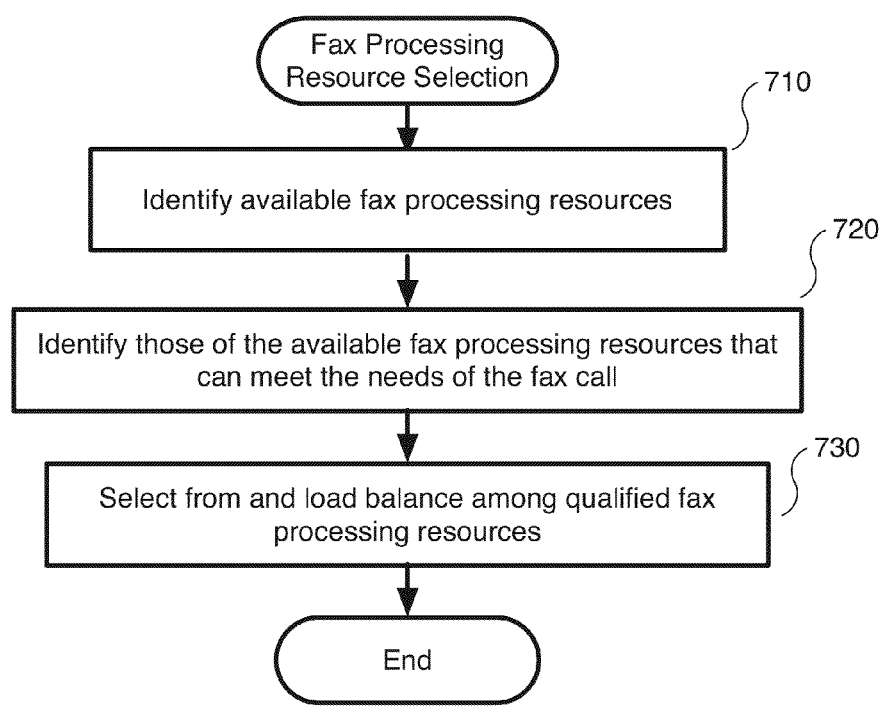
FIG. 7 is a flowchart illustrating fax processing resource selection in accordance with an embodiment of the present invention.

FIG. 7 is a flowchart illustrating fax processing resource selection in accordance with an embodiment of the present invention. In one embodiment, the steps described with reference to FIG. 7 are performed within block 640 of FIG. 6.

At block 710, available fax processing resources are identified. According to one embodiment, a database exists within the Internet fax system that maintains information identifying (i) all fax processing resources within the Internet fax system, (ii) the DACS and port number with which each fax processing resource is associated and (iii) features of each fax processing resource. The PBX may identify the universe of fax processing resources available to it by obtaining information from the database relating to fax processing resources associated with one or more DACS connected to the PBX.

In some embodiments, the PBX may maintain information regarding those fax processing resources that are ready to accept a call based on device status information periodically provided to the PBX by its associated fax processing resources. In other embodiments, the PBX may request device status information as needed from its associated fax processing resources or query the status from a database that maintains such information. In an environment in which device status is available to the PBX, the PBX may retrieve from the database feature information for only those fax processing resources known to currently be ready to accept a call.

At block 720, those of the available fax processing resources that can meet the needs of the inbound fax call are identified. According to one embodiment, the list of available fax processing resources generated in block 710 is pruned to produce a list of qualified fax processing resources by excluding those fax processing resources that are incapable of handling the fax speed and/or other capabilities deemed to be required to processing the fax signal associated with the inbound fax call.

At block 730, an appropriate fax processing resource is selected from the list of qualified fax processing resources. According to one embodiment, load balancing is performed among those of the qualified fax processing resources by performing a least recently used selection algorithm or the like. For example, the PBX may avoid selection of a previously selected fax processing resource until all other fax processing resources on the list of qualified fax processing resources have been subsequently selected to process an inbound fax call.

Figure 8:
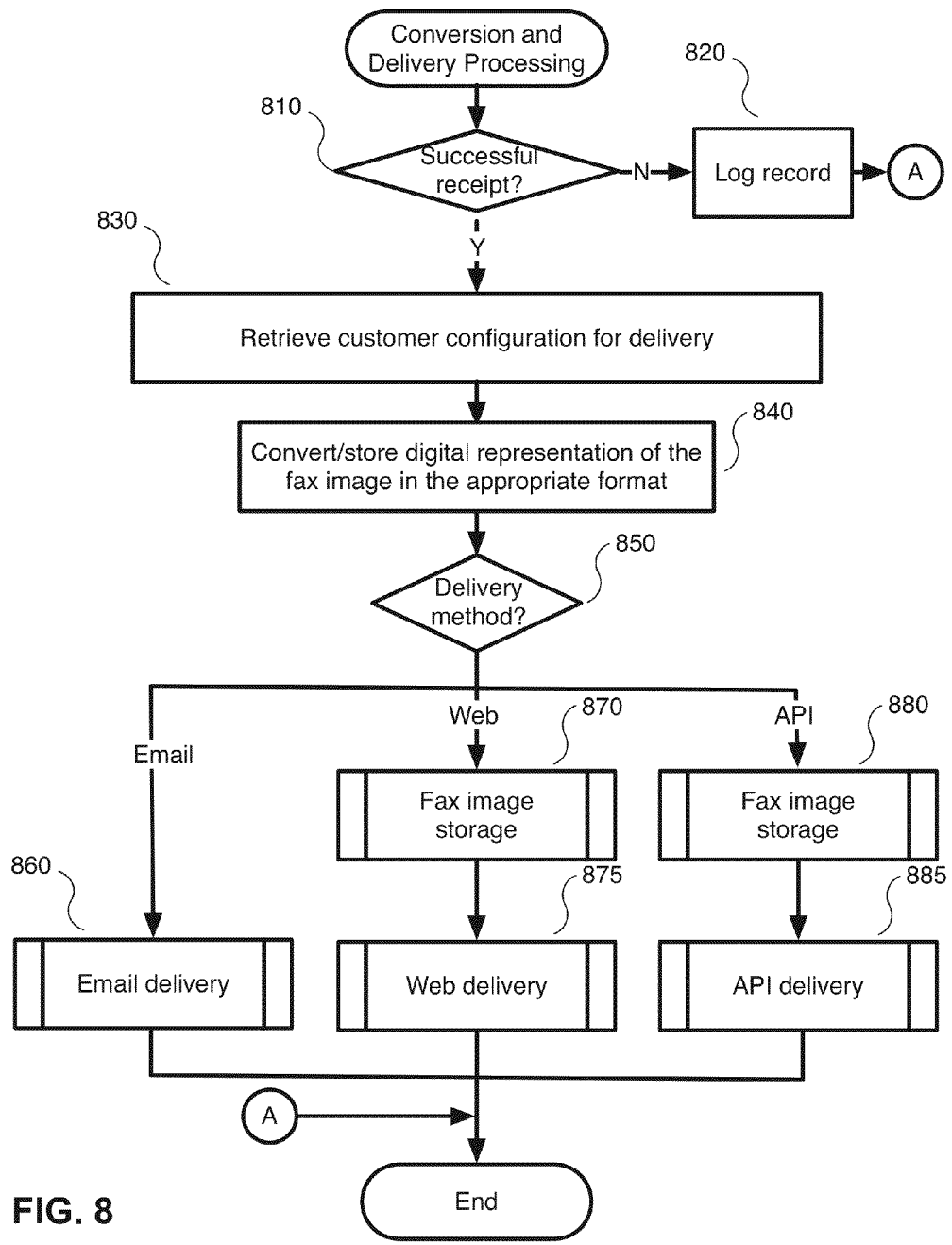
FIG. 8 is a flowchart illustrating conversion and delivery processing in accordance with an embodiment of the present invention.

FIG. 8 is a flowchart illustrating conversion and delivery processing in accordance with an embodiment of the present invention. In one embodiment, the steps described with reference to FIG. 8 are performed within block 680 of FIG. 6.

At decision block 810, a determination is made regarding whether the fax signal associated with the inbound fax call was successfully received. According to one embodiment, successful receipt means receipt of all pages encoded within the fax signal and proper completion of all phases of the fax protocol. If it is determined that fax signal has been successfully received, then conversion and delivery processing continue with block 830; otherwise, conversion and delivery processing branch to block 820.

At block 820, detailed information regarding the inbound fax call and the associated fax signal can be stored in a log to facilitate subsequent troubleshooting.

At block 830, subscriber account information is retrieved to obtain delivery preferences/configuration for the fax based on the fax number dialed. In embodiments of the present invention, each subscriber may have one or more fax numbers and each fax number may have zero or more authorized users.

At block 840, based on the subscriber's established preferences, the received fax may be converted from TIFF format to PDF format and stored for retrieval via the web or API. According to one embodiment, received faxes are stored based on their destination address, not by user thereby supporting the notion of a truly multi-user system in which the subscriber is not an individual user, but rather is an organization having multiple users. In this manner, multiple users may be authorized to access and/or delete faxes received on a particular fax number.

At decision block 850, the delivery method is determined. According to one embodiment, various configurable delivery preferences include, one or more of a preferred image file format (e.g., TIFF or PDF), delivery method and zero or more authorized users and associated access rights (e.g., read only, read/delete). Exemplary delivery methods include retrieval via a web site associated with the Internet fax server, retrieval via API, delivery of an email notification with an embedded link from which the fax can be retrieved or delivery of the fax as an email attachment (with or without password protection or PGP encryption).

Depending upon the particular implementation, the delivery method may be established at the subscriber level, the fax number level and/or the user level. For sake of brevity and simplicity, in the present example, it is assumed that a delivery method is established at the subscriber level or the fax number level. As such, in accordance with the present example, each user designated to receive a copy of faxes received on the particular fax number will receive the fax in the same form and via the same delivery method. If the delivery method is email, then conversion and delivery processing continues with block 860. If the delivery method is web, then processing continues with block 870. If the delivery method is API, conversion and delivery processing continues with block 880. Those skilled in the art will recognize various other delivery methods, including, but not limited to, text message notification, instant message notification, pager notification, notification via automated voice call and the like.

At block 860, the fax message is delivered via email to the designated users. Depending upon the particular implementation, a copy of the fax image may or may not also be stored within the Internet fax system. According to one embodiment, email delivery proceeds as described with reference to FIG. 9. Upon completion of the email delivery, conversion and delivery processing is complete.

At block 870, the fax image is stored within the Internet fax system to make it available for access to authorized users. According to one embodiment, fax image storage proceeds as described with reference to FIG. 10.

At block 875, delivery of the fax image is performed via a web delivery mechanism. According to one embodiment, fax image storage proceeds as described with reference to FIG. 11. Upon completion of the web delivery, conversion and delivery processing is complete.

At block 880, the fax image is stored within the Internet fax system to make it available for access to authorized users. According to one embodiment, fax image storage proceeds as described with reference to FIG. 10.

At block 885, delivery of the fax image is performed via an API delivery mechanism. According to one embodiment, fax image storage proceeds as described with reference to FIG. 11. Upon completion of the API delivery, conversion and delivery processing is complete.

While in the context of the present example, fax image storage is shown as taking place for only the web and API delivery methods, in one embodiment, fax image storage may take place for all delivery methods.

For simplicity FIG. 8 shows the delivery method determination being performed only once; however, it is to be understood that decision block 850 may be placed within a loop to allow a delivery method determination to be made for each user to which a received fax is to be delivered. For example, embodiments of the present invention may provide highly customizable delivery options. According to one embodiment, delivery preferences can be configured at one or more levels of the hierarchy (e.g., the subscriber level, the fax number level and/or the user level) with preferences defined at lower levels of the hierarchy overriding preferences (defaults) established at higher levels of the hierarchy. As such, a received fax may be delivered to multiple users via different delivery methods. For example, a subscriber's default delivery preferences may be web delivery (e.g., retrieval via a web site associated with the Internet fax system) in PDF form with delivery to users A, B, C and D. Meanwhile, a particular fax number associated with the subscriber may be configured via delivery preferences to deliver a copy of all received faxes to users A, B and C, but not D. Furthermore, users A and B may have individually established delivery preferences, such as email notification and email delivery via password protected PDF, respectively. In such a configuration, all faxes received on the particular fax number will be delivered to users A, B and C (but not user D) by causing an email notification to be sent to user A, causing an email with a password protected PDF containing an image of the received fax to be sent to user B and causing a copy of the received fax to be stored, e.g., in file store 280, that is accessible via the web site by user C.

While for simplicity FIG. 8 treats the successful receipt determination (i.e., decision block 810) as an all or nothing proposition (i.e., either the entire fax is received successfully or it is considered a failure), in other embodiments, partial fax receipt may be accommodated via an associated delivery preference specifying whether partial faxes should be delivered and if so by logging the partial receipt and treating the partial receipt as a successful receipt for purposes of decision block 810. In some embodiments, the partial delivery (on or off) preference may be supported only as a per-destination preference (not per-subscriber or per-user). Similarly, partial delivery may be supported for only a limited number of the delivery methods (e.g., email and API delivery, but not web delivery).

Figure 9:
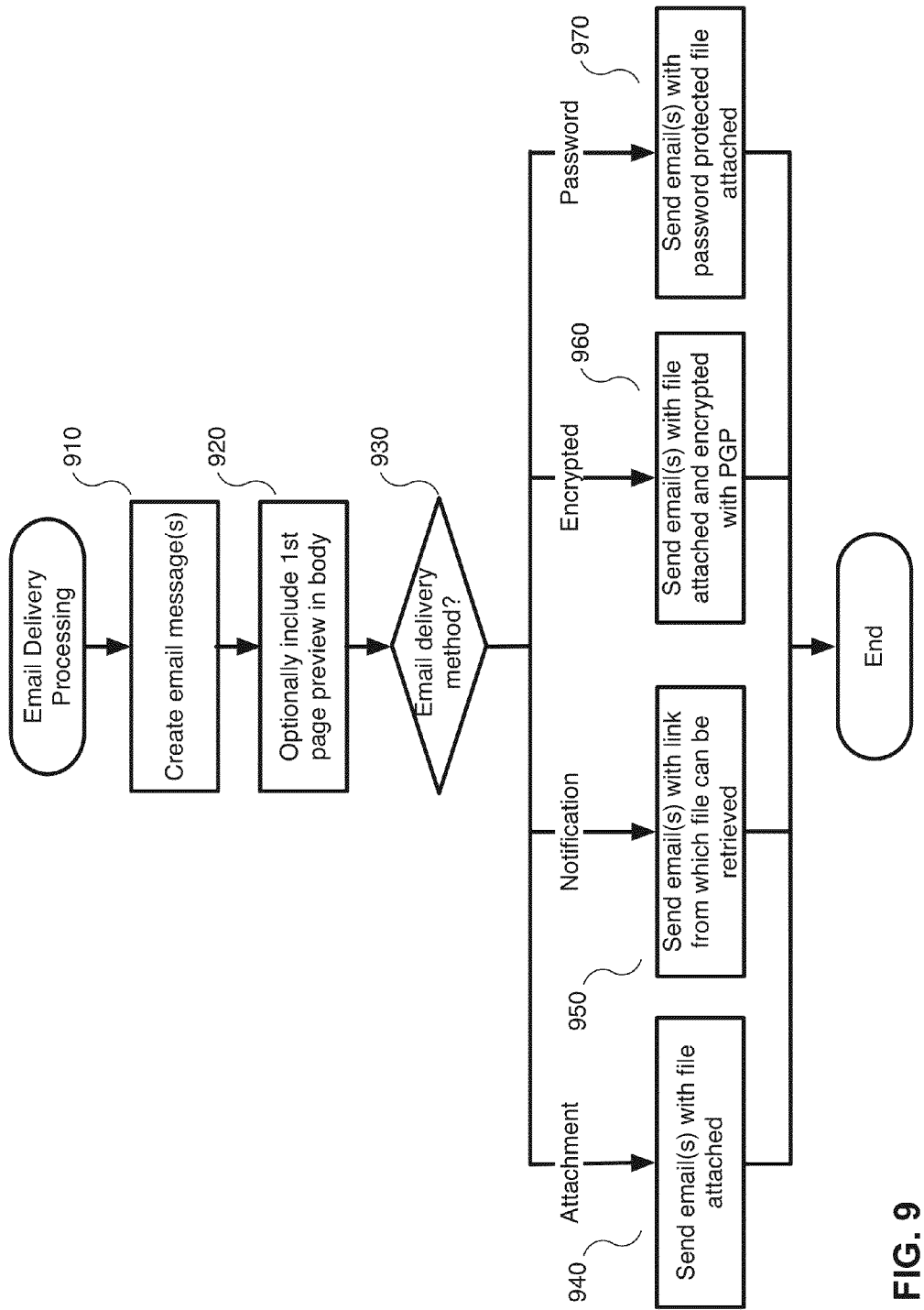
FIG. 9 is a flowchart illustrating email delivery processing in accordance with an embodiment of the present invention.

FIG. 9 is a flowchart illustrating email delivery processing in accordance with an embodiment of the present invention. In one embodiment, the steps described with reference to FIG. 9 are performed within block 860 of FIG. 8.

At block 910, one or more email messages are created directed to the users designated to receive a copy of received faxes for the fax number at issue. Depending upon the particular implementation, a single email message can be created directed to all users designated to receive a copy of received faxes for the fax number at issue. Alternatively, flexibility can be enhanced by creating separate email messages for each designated user in accordance with their specific delivery preferences. In some embodiments, the fax server or email gateway may apply custom messaging to the email message to make the email message appear to be from a customer's service provider that operates as a reseller of the Internet fax service, for example. Alternatively, the email message may be otherwise reformatted based on customer-defined preferences.

According to one embodiment, post-processing custom messaging/email capabilities may be provided on a per-subscriber and per-user within the subscriber basis in order to support, among other things, re-sale of the fax service and custom parsing requirements the user's system (if they parse email with a program) may have, such as subject line sorting in a way that works for the user in their email client (e.g., putting the number from which the fax was received at the beginning of the subject line (or the date and time or the page count or whatever) so the user can sort and find faxes in the context of their email client (e.g., Microsoft Outlook or the like) easily by subject line)

At block 920, a preview of the first page of the fax may be embedded inline within the email message. According to one embodiment, the preview may be embedded in the form of a reduced size thumbnail image of the first page of the fax. In some embodiments, the preview may include more than one page.

At decision block 930, the specific email delivery method is ascertained. Numerous email delivery and notification methods are contemplated. For purposes of simplicity, the present example, illustrates processing relating to unencrypted email attachment, email notification, encrypted email attachment and password-protected email attachment. If the email delivery method is attachment, the email delivery processing continues with block 940. If the email delivery method is notification, then email delivery processing continues with block 950. If the email delivery method is encrypted, processing continues with block 960. If the email delivery method is password, then email delivery processing continues with block 970.

At block 940, the one or more generated email messages are sent with an attachment in the previously determined desired image file format.

At block 950, the one or more generated email messages are sent with a link from which the fax image can be retrieved. According to one embodiment, the link is a secure link that uses SSL to transmit the fax image.

At block 960, the one or more generated email messages are sent with an attachment in the form of an image file encrypted with PGP.

At block 970, the one or more generated email messages are sent with an attachment in the form of a password-protected image file, such as a password-protected PDF.

For simplicity FIG. 9 shows the email delivery method determination being performed only once; however, it is to be understood that decision block 930 may be placed within a loop to allow an email delivery method determination to be made for each user to which a received fax is to be delivered in a manner similar to that described with reference to FIG. 8. As such, each user designated to receive an email delivery/notification may have such email delivery/notification delivered in accordance with their particular preferences.

Figure 10:
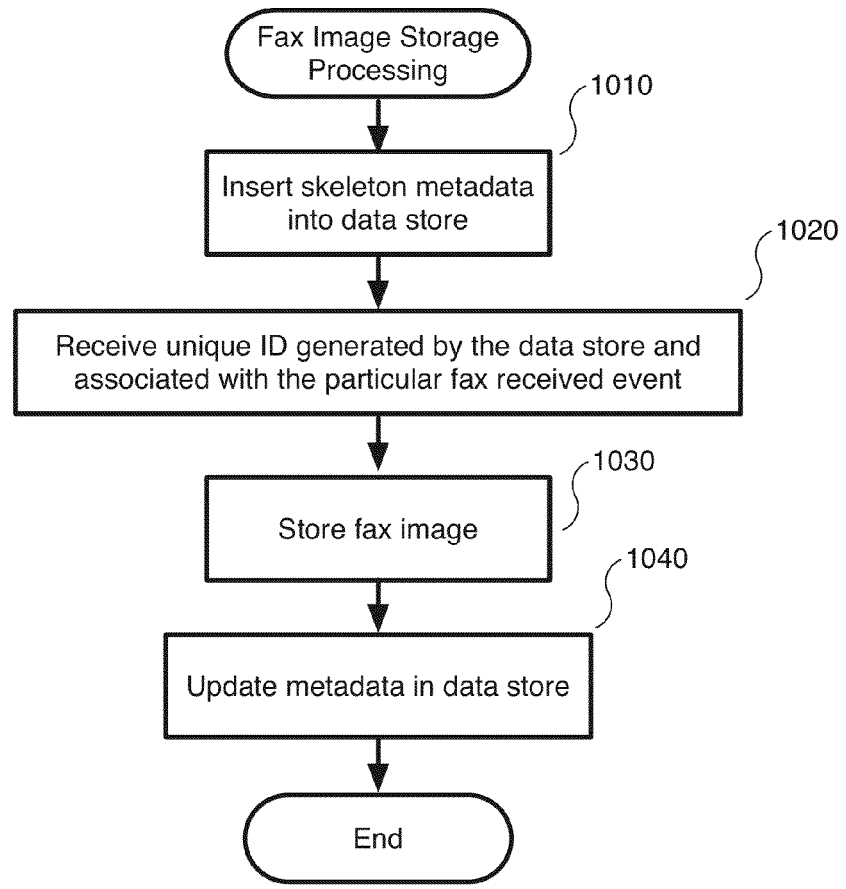
FIG. 10 is a flowchart illustrating fax image storage processing in accordance with an embodiment of the present invention.

FIG. 10 is a flowchart illustrating fax image storage processing in accordance with an embodiment of the present invention. In one embodiment, the steps described with reference to FIG. 10 are performed within blocks 870 and 880 of FIG. 8.

At block 1010, skeleton metadata is inserted into data store 290. According to one embodiment, the skeleton metadata is a subset of the metadata (e.g., excluding the associated directory path as it has yet to be determined) associated with the received fax and is inserted by the fax server. In one embodiment, responsive to the insertion data store 290 returns to the fax server a unique ID (e.g., a fax ID of 1 to n digits) to be associated with this particular fax received event. According to one embodiment, the fax ID is based on an auto-incremented unique primary key.

At block 1020, the unique ID generated by data store 290 is received by the fax server.

At block 1030, the fax image is stored. According to one embodiment, the fax image is stored within the file store 280 in a directory path that is based at least in part on the fax ID. In one embodiment, if an appropriate directory has not already been created, logic implemented within the fax server may create a directory on the file store 280 in accordance with the following convention, for example:

/export/Infaxes/ZZZZ/YYYY-MM-DD/VVVV

Where:

/export/Infaxes/is fixed (this is where the NFS file store is mounted)

ZZZZ represents the ID associated in the database with the destination number (can be 1 to n digits long)

YY-MM-DD represents the current year/month/day

VVVV represents the unique ID associated in the database with this particular fax received event (can be 1 to n digits long)

At block 1040, metadata regarding the received fax is updated, for example, to include the (now known) directory path. According to one embodiment, the metadata includes:
1. A system-established unique identifier for this received fax
2. A numeric identifier corresponding to the destination number on which the fax was received
3. A system-established unique identifier for the file that contains the image of the fax (e.g., the PDF or TIFF image)
4. The date and time the fax was received
5. The data and time at which the call resulting in the received fax began
6. The caller ID or "source" or "source address" of the call
7. The number of pages in the image
8. The subscriber (not the user) for whom the fax is addressed Additional metadata (in other related tables by the corresponding numeric identifiers) may include:

For #2 above:
The phone number or destination address associated with the destination that the fax was received on, which subscriber that phone number belongs to.

For #3 above
A physical storage location associated with the file id.
Either of a destination or a logical folder (user created) in which the file currently resides.
A system generated unique file name for the file, which may be used when the user downloads it. The user can also rename the file either when it is residing in the destination number or when it is residing in a folder. An example system-generated name would be along the lines of fax012345.pdf.

Figure 11:
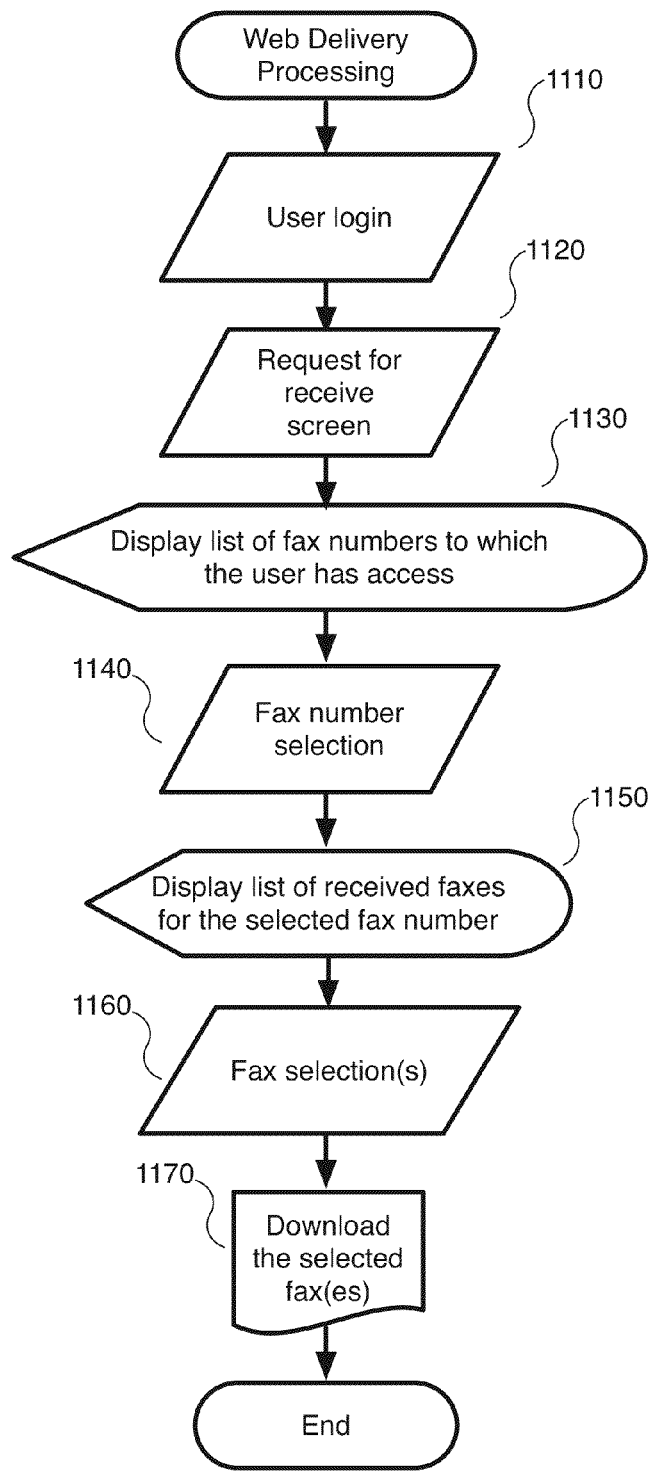
FIG. 11 is a flowchart illustrating web delivery processing in accordance with an embodiment of the present invention.

FIG. 11 is a flowchart illustrating web delivery processing in accordance with an embodiment of the present invention. In one embodiment, the steps described with reference to FIG. 11 are performed within block 875 of FIG. 8. For simplicity, only a subset of interactions with the web site are depicted in FIG. 11—those relating to retrieval of a received fax.

At block 1110, a customer logs in via a web site, e.g., web site 270, associated with the Internet fax system. According to one embodiment, each user associated with a subscriber is assigned a user name and password.

Assuming the user is logging into the web site to view and/or retrieve received faxes, at block 1120, a request for the receive page is received from the user.

Concurrently with displaying of the receive page, at block 1130, a list of fax numbers to which the user has access is displayed (which might be a subset of all fax numbers associated with the subscriber or even none).

At block 1140, the user selects a fax number from the list of fax numbers and the fax number selection is received by a web server associated with the Internet fax system.

At block 1150, responsive to the fax number selection, a list of received faxes for the selected fax number is displayed. Depending upon the particular implementation, received faxes may be selectively displayed in ascending or descending order according to the time and date received. Received faxes may also be sorted based on the source address and/or based on whether the received fax has already been viewed or downloaded.

At block 1160, the user selects a fax from the list of received faxes and the fax selection is received by the web server.

At block 1170, the selected fax is downloaded to the client system being used by the user. Various other interactions relating to administrative settings and receiving, sending and/or organizing faxes may be supported by the web site interface. For example, as described above, web site 270 may support the renaming of faxes and the creation and use of logical folders to organize sent and/or received faxes.

Figure 12:
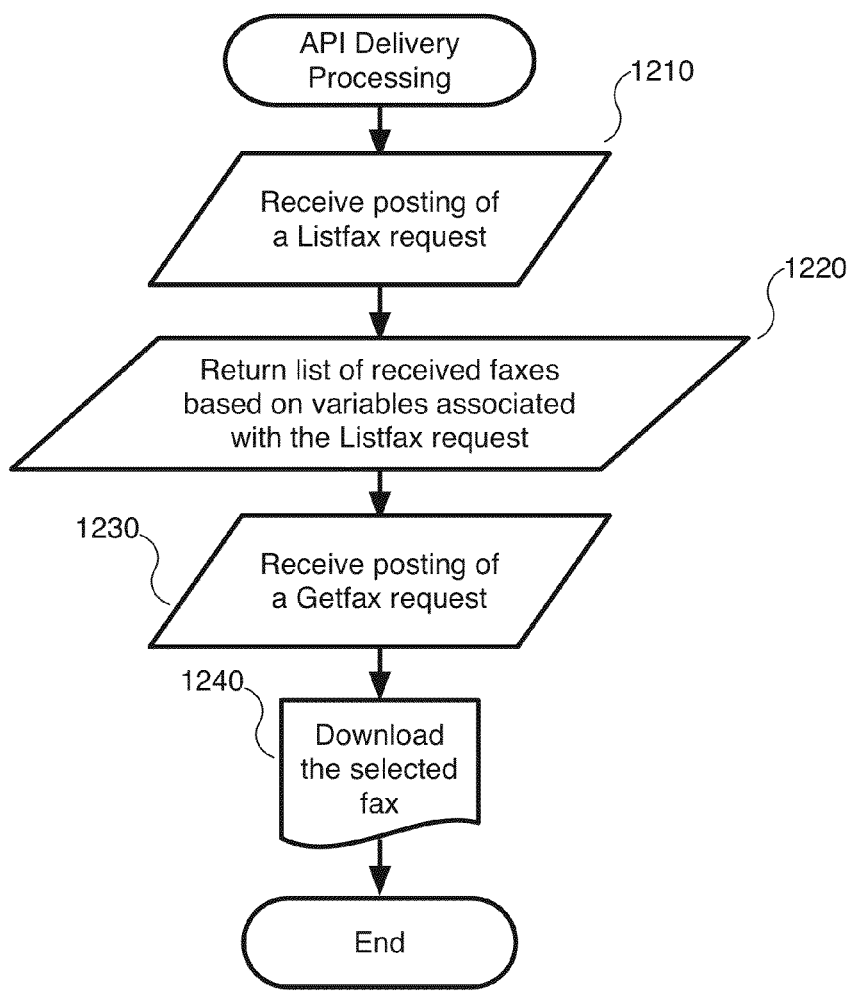
FIG. 12 is a flowchart illustrating API delivery processing in accordance with an embodiment of the present invention.

FIG. 12 is a flowchart illustrating API delivery processing in accordance with an embodiment of the present invention. In one embodiment, the steps described with reference to FIG. 12 are performed within block 885 of FIG. 8. For simplicity, only a subset of interactions with a web services interface, e.g., web services 260, are depicted in FIG. 12—those relating to retrieval of a received fax. Further details regarding an exemplary set of operations that may be automated via API-based interactions with an Internet fax system are provided in Appendix.

At block 1210, a subscriber application posts a Listfax request to the Internet fax system web services interface, e.g., web services 260 via HTTP or HTTPS. According to one embodiment, the Listfax request allows for programmatic listing of currently received faxes. For purposes of maintaining security consistent with access via the web site, the Listfax request may require, among other information, the company credential associated with the subscriber as assigned by the Internet fax system, a user name associated with the subscriber as assigned by the Internet fax system and the password associated with the user making the request. Various other POST variables include, but are not limited to, a begin variable, which allows the subscriber application to retrieve faxes received after the specified date/time. Further details regarding an exemplary Listfax operation are provided in the attached Appendix.

Responsive to the Listfax request, at block 1220, a list of received faxes, including corresponding fax IDs, are returned to the subscriber application based on the variables associated with the Listfax request.

At block 1230, the subscriber application posts a Getfax request to the Internet fax system web services interface via HTTP or HTTPS. According to one embodiment, the Getfax request allows for programmatic downloading of a received fax. As above, for purposes of maintaining security consistent with access via the web site, the Getfax request may require, among other information, the company credential, a user name and the password associated with the user making the request. In one embodiment, the fax ID of the desired fax is a required POST variable. Further details regarding an exemplary Getfax operation are provided in the attached Appendix.

At block 1240, the selected fax is downloaded to the subscriber application.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
receiving, by an Internet fax system, an inbound fax call having associated therewith a source address, a destination address and a fax signal, wherein the Internet fax system is coupled in communication with a circuit-switched network and a packet-switched network and includes a plurality of fax processing resources having different configurations, features, capabilities or capacities;
determining, by the Internet fax system, one or more desired fax protocol technical call processing capabilities for processing the fax signal based on one or more of the source address, the destination address, whether the inbound fax call was received via the circuit-switched network or the packet-switched network and a service provider through which the inbound fax call was received; and dynamically selecting from among the plurality of fax processing resources, by the Internet fax system, a fax processing resource having the one or more desired fax protocol technical processing capabilities to translate the fax signal into a digital representation.

2. The method of claim 1, wherein a desired fax protocol technical call processing capability of the one or more desired fax protocol technical call processing capabilities is intended to compensate for presence or absence of packet delays or jitter.

3. The method of claim 1, wherein a desired fax protocol technical call processing capability of the one or more desired fax protocol technical call processing capabilities is intended to compensate for a known configuration, limitation or preference associated with the source address or the destination address.

4. The method of claim 3, further comprising performing, by the Internet fax system, a source address and a subscriber account lookup within a centralized database of the Internet fax system to identify the known configuration, limitation or preference.

5. The method of claim 3, wherein the known configuration, limitation or preference relates to one or more of transmission speed capability, transmission error frequency and a type of fax standard.

6. The method of claim 1, further comprising prioritizing desired fax protocol technical call processing capabilities of the one or more desired fax protocol technical call processing capabilities that are associated with a particular network connection over those associated with one or both of the source address and the destination address.

7. The method of claim 1, wherein said receiving, by an Internet fax system, an inbound fax call comprises receiving the inbound fax call at a telecommunications system of the Internet fax system.

8. The method of claim 7, wherein said determining, by the Internet fax system, one or more desired fax protocol technical call processing capabilities for processing the fax signal comprises determining the one or more desired fax protocol technical call processing capabilities for processing the fax signal by a private branch exchange (PBX) of a plurality of PBXs of the Internet fax system.

9. The method of claim 8, further comprising performing load balancing, by the telecommunications system, among the plurality of PBXs.

10. The method of claim 8, further comprising switching, by the PBX, the inbound fax call to the fax processing resource.

11. The method of claim 10, wherein said switching, by the PBX, the inbound fax call to the fax processing resource comprises calling a digital access cross connect system (DACS) logically interposed between the PBX and the fax processing resource.

12. The method of claim 11, wherein the plurality of fax processing resources include one or more fax servers having one or more analog fax modems, one or more digital fax boards or one or more soft modems and wherein the method further comprises:

translating, by the fax processing resource, the fax signal into the digital representation; and causing, by the Internet fax system, the digital representation to be delivered or otherwise made available to one or more users associated with a subscriber of the Internet fax system.

13. A non-transitory computer-readable storage medium tangibly embodying a set of instructions, which when executed by one or more processors of one or more computer systems of an Internet fax system, cause the one or more processors to perform a method comprising:

receiving an inbound fax call having associated therewith a source address, a destination address and a fax signal, wherein the Internet fax system is coupled in communication with a circuit-switched network and a packet-switched network and includes a plurality of fax processing resources having different configurations, features, capabilities or capacities;

determining one or more desired fax protocol technical call processing capabilities for processing the fax signal based on one or more of the source address, the destination address, whether the inbound fax call was received via the circuit-switched network or the packet-switched network and a service provider through which the inbound fax call was received; and dynamically selecting from among the plurality of fax processing resources a fax processing resource having the one or more desired fax protocol technical processing capabilities to translate the fax signal into a digital representation.

14. The computer-readable storage medium of claim 13, wherein a desired fax protocol technical call processing capability of the one or more desired fax protocol technical call processing capabilities is intended to compensate for presence or absence of packet delays or jitter.

15. The computer-readable storage medium of claim 13, wherein a desired fax protocol technical call processing capability of the one or more desired fax protocol technical call processing capabilities is intended to compensate for a known configuration, limitation or preference associated with the source address or the destination address.

16. The computer-readable storage medium of claim 15, wherein the method further comprises performing a source address and a subscriber account lookup within a centralized database of the Internet fax system to identify the known configuration, limitation or preference.

17. The computer-readable storage medium of claim 15, wherein the known configuration, limitation or preference relates to one or more of transmission speed capability, transmission error frequency and a type of fax standard.

18. The computer-readable storage medium of claim 13, wherein the method further comprises prioritizing desired fax protocol technical call processing capabilities of the one or more desired fax protocol technical call processing capabilities that are associated with a particular network connection over those associated with one or both of the source address and the destination address.

19. An Internet fax system comprising:
a plurality of call mediation systems;
a plurality of fax processing resources associated with each of the plurality of call mediation systems;
a telecommunications system having a plurality of circuit and packet switched connections, the telecommunications system configured to receive an inbound fax call and switch the inbound fax call to a call mediation system of the plurality of call mediation systems, the inbound fax call having associated therewith a source address, a destination address and a fax signal; and wherein the call mediation system:
   determines one or more desired fax protocol technical call processing capabilities for processing the fax signal based on one or more of the source address, the destination address, a service provider through which the inbound fax call was received and a type of connection of the plurality of circuit and packet switched connections through which the inbound fax call was received; and
   dynamically selects from among the plurality of fax processing resources a fax processing resource having the one or more desired fax protocol technical processing capabilities to translate the fax signal into a digital representation.

20. The system of claim 19, wherein a desired fax protocol technical call processing capability of the one or more desired fax protocol technical call processing capabilities is intended to (i) compensate for presence or absence of packet delays or jitter or (ii) compensate for a known configuration, limitation or preference associated with the source address or the destination address.

\* \* \* \* \*